(12) United States Patent
Sanou et al.

(10) Patent No.: US 7,505,215 B2
(45) Date of Patent: Mar. 17, 2009

(54) CAMERA MODULE AND ELECTRONIC APPARATUS

(75) Inventors: Makoto Sanou, Chiba (JP); Hirokazu Fujioka, Ibaraki (JP)

(73) Assignee: Sony Corporation, Tokyo (JP)

( * ) Notice: Subject to any disclaimer, the term of this patent is extended or adjusted under 35 U.S.C. 154(b) by 52 days.

(21) Appl. No.: 11/526,741

(22) Filed: Sep. 26, 2006

(65) Prior Publication Data

US 2007/0097518 A1    May 3, 2007

(30) Foreign Application Priority Data

Oct. 28, 2005    (JP) ............... 2005-315313

(51) Int. Cl.
  *G02B 15/14* (2006.01)
  *G02B 7/02* (2006.01)
(52) U.S. Cl. ...................... 359/694; 359/822
(58) Field of Classification Search ........... 359/694, 359/699, 702–704, 808, 811, 813–814, 818–819, 359/822–824
See application file for complete search history.

(56) References Cited

U.S. PATENT DOCUMENTS

2002/0057468 A1    5/2002    Segawa et al.

2004/0075620 A1    4/2004    Tamaka et al.

FOREIGN PATENT DOCUMENTS

| CN | 1379586 | 11/2002 |
|---|---|---|
| DE | 103 17 827 A1 | 12/2004 |
| JP | 2005-086341 | 3/2005 |

OTHER PUBLICATIONS

EPO Search Report Dated Feb. 19, 2007; 7 pages.

*Primary Examiner*—Ricky L Mack
*Assistant Examiner*—Dawayne A Pinkney
(74) *Attorney, Agent, or Firm*—Rader, Fishman & Grauer PLLC; Ronald P. Kananen

(57) ABSTRACT

Disclosed herein is a camera module including: a camera body including a lens-barrel holding a shooting optical system, a substrate attached to the lens-barrel, an image pickup device incorporated in the lens-barrel and operative to pick up an image of an object focused by the shooting optical system and to output an image pickup signal, and a signal processing unit provided on the substrate and operative to receive the image pickup signal outputted from the image pickup device and to perform a predetermined signal processing; and a shield case covering the lens-barrel and the substrate and operative to provide electromagnetic shielding for the image pickup device and the signal processing unit.

11 Claims, 23 Drawing Sheets

F I G . 8
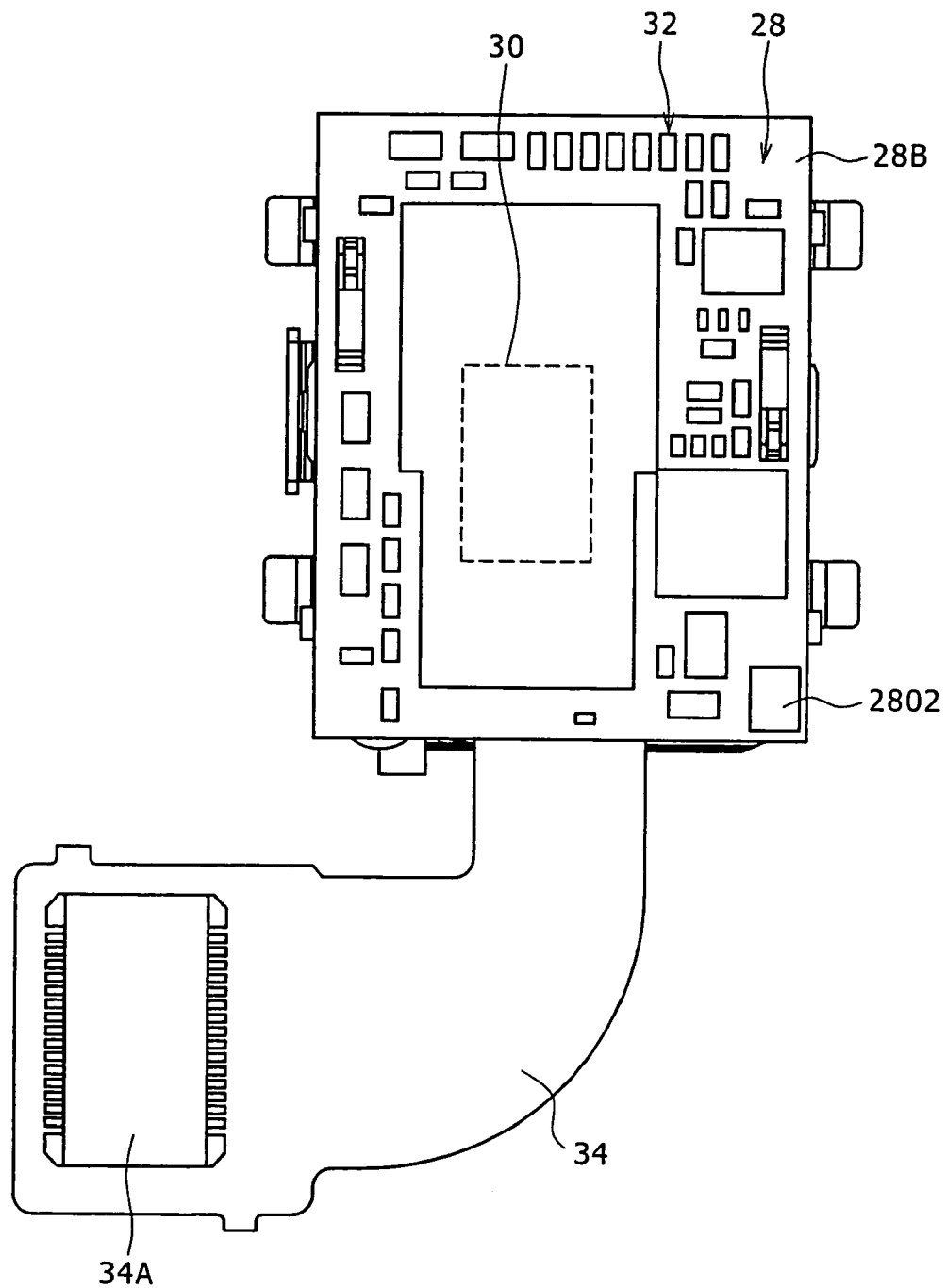

CAMERA MODULE AND ELECTRONIC APPARATUS

CROSS REFERENCES TO RELATED APPLICATIONS

The present invention contains subject matter related to Japanese Patent Application JP 2005-315313 filed in the Japanese Patent Office on Oct. 28, 2005, the entire contents of which being incorporated herein by reference.

BACKGROUND OF THE INVENTION

1. Field of the Invention

The present invention relates to a camera module and an electronic apparatus.

2. Description of the Related Art

In recent years there have been provided electronic apparatuses such as cellular phones and PDAs (Personal Digital Assistants) in which a camera module is incorporated.

A camera module includes a lens-barrel holding a shooting optical system, a substrate attached to the rear end of the lens-barrel, an image pickup device incorporated in the lens-barrel and operative to pick up an image of an object guided by the shooting optical system and to output an image pickup signal, and a signal processing unit provided on the substrate and operative to receive the image pickup signal outputted from the image pickup device and to perform a predetermined signal processing, and a shield case is provided for covering the lens-barrel and the substrate and providing electromagnetic shielding for the image pickup device and the signal processing unit (refer to, for example, Japanese Patent Laid-open No. 2005-86341).

SUMMARY OF THE INVENTION

Meanwhile, the lens-barrel of such a camera module is in many cases configured by stacking a plurality of lens-barrel component members.

In such a lens-barrel, even where the dispersions of dimensions of each lens-barrel component member are within the respective ranges of permissible errors, the dispersions of dimensions of the lens-barrel component members are added in the direction of stacking of the plurality of lens-barrel component members.

Therefore, how to position the shield case relative to the lens-barrel configured by stacking the plurality of lens-barrel component members and how to mount the shield case to the lens-barrel without possibility of chattering in the stacking direction of the plurality of lens-barrel component members are important problems.

Thus, there is a need for a camera module and an electronic apparatus which are advantageous for positioning a shield case relative to a lens-barrel and mounting the shield case to the lens-barrel without possibility of chattering, in the direction of stacking of a plurality of lens-barrel component members.

According to an embodiment of the present invention, there is provided a camera module including a camera body and a shield case. The camera body including: a lens-barrel holding a shooting optical system; a substrate attached to the lens-barrel; an image pickup device incorporated in the lens-barrel and operative to pick up an image of an object focused by the shooting optical system and to output an image pickup signal; and a signal processing unit provided on the substrate and operative to receive the image pickup signal outputted from the image pickup device and to perform a predetermined signal processing. The shield case covering the lens-barrel and the substrate and operative to provide electromagnetic shielding for the image pickup device and the signal processing unit. The lens-barrel includes a plurality of lens-barrel component members stacked together, and a clamping mechanism is provided by which a portion of two lens-barrel component members adjacent to each other is clamped from both ends in the direction of said stacking, whereby the shield case is positioned relative to the lens-barrel and mounted to the lens-barrel, in the direction of the stacking.

Besides, according to another embodiment of the present invention, there is provided an electronic apparatus including a casing, and a camera module incorporated in the casing. The camera module includes a camera body, and a shield case. The camera body includes: a lens-barrel holding a shooting optical system; a substrate attached to the lens-barrel; an image pickup device incorporated in the lens-barrel and operative to pick up an image of an object focused by the shooting optical system and to output an image pickup signal; and a signal processing unit provided on the substrate and operative to receive the image pickup signal outputted from the image pickup device and to perform a predetermined signal processing. The shield case covers the lens-barrel and the substrate and provides electromagnetic shielding for the image pickup device and the signal processing unit. The lens-barrel includes a plurality of lens-barrel component members stacked together. A clamping mechanism is provided by which a portion of two lens-barrel component members adjacent to each other is clamped from both ends in the direction of the stacking, whereby the shield case is positioned relative to the lens-barrel and mounted to the lens-barrel, in the direction of the stacking.

According to the present invention, the clamping mechanism for clamping a portion of two adjacent lens-barrel component members by the shield case from both ends in the direction of stacking of the lens-barrel component members is provided. Therefore, even if the dispersions of dimensions of the lens-barrel component members are added in the stacking direction, this configuration is advantageous for positioning the shield case relative to the lens-barrel in the stacking direction and for mounting the shield case to the lens-barrel without possibility of chattering in the stacking direction of the two lens-barrel component members.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a view along arrow A of FIG. 7;

DETAILED DESCRIPTION OF THE PREFERRED EMBODIMENTS

First Embodiment

Figure 1A:
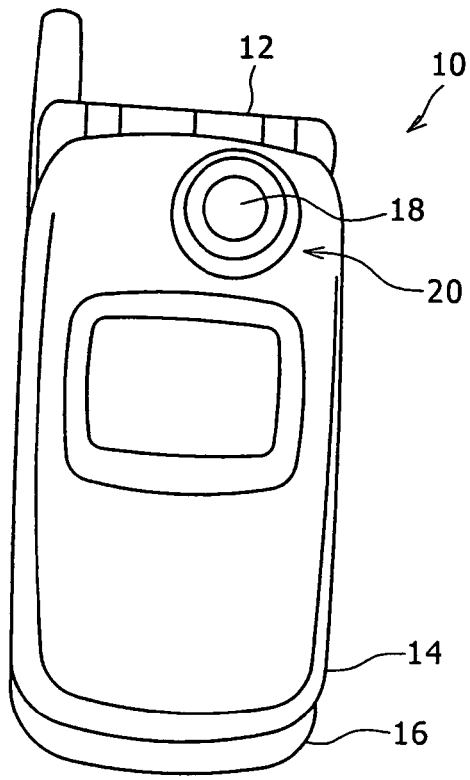
FIGS. 1A and 1B each show an appearance of an example of a cellular phone with a camera module incorporated therein.

Now, a first embodiment of the present invention will be described below referring to the drawings.

Figure 1B:
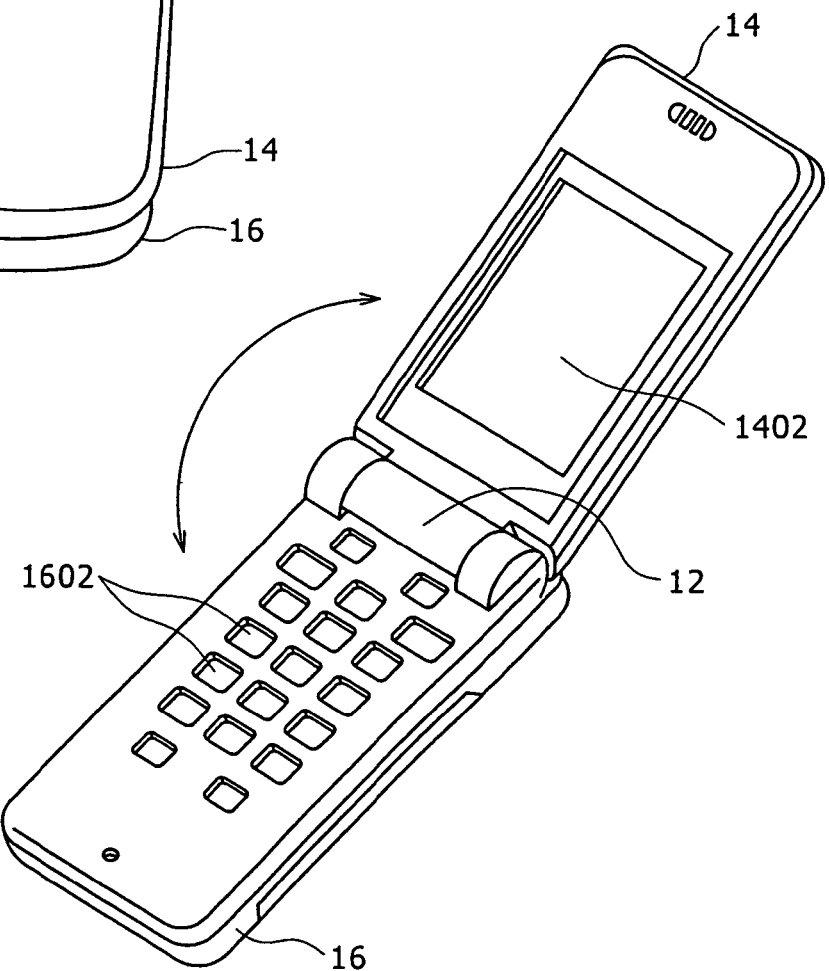

FIGS. 1A and 1B each show an appearance of an example of a cellular phone 10 as an electronic apparatus with a camera module incorporated therein.

As shown in FIGS. 1A and 1B, the cellular phone 10 has first and second casings 14 and 16 which are swingably connected to each other through a hinge portion 12.

A liquid crystal display panel 1402 is provided at the inside surface of the first casing 14, and operating switches 1602 such as ten-keys and functional keys are provided at the inside surface of the second casing 16.

A camera module 20 is incorporated in a base end portion of the first casing 14, and an image shot by the camera module 20 is displayed on the liquid crystal display panel 1402.

Figure 4:
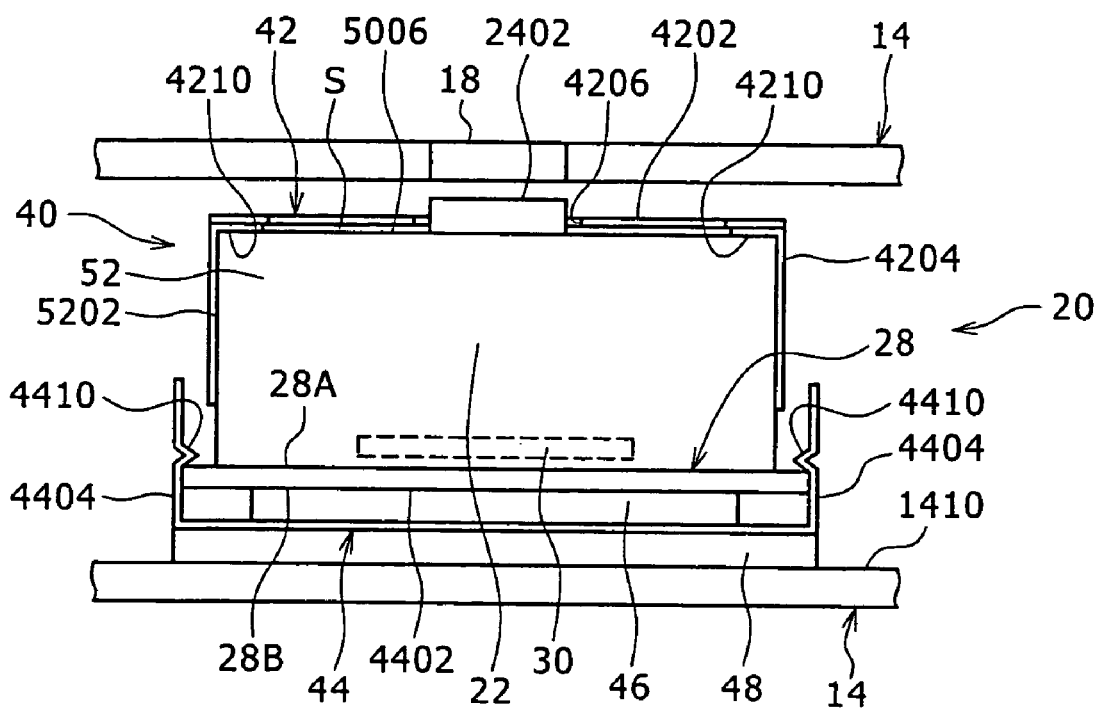
FIG. 4 is a sectional view of the camera module in the state of being incorporated in a first casing.

FIGS. 2A and 2B and FIGS. 3A and 3B are perspective views of the camera module 20, FIG. 4 is a sectional view of the camera module 20 in the state of being incorporated in the first casing 14, and FIGS. 5A and 5B and FIGS. 6A and 6B are perspective views of the camera module 20 from which a shield case 40 has been removed.

The camera module 20 includes a camera body 22 and the shield case 40.

Figure 5A:
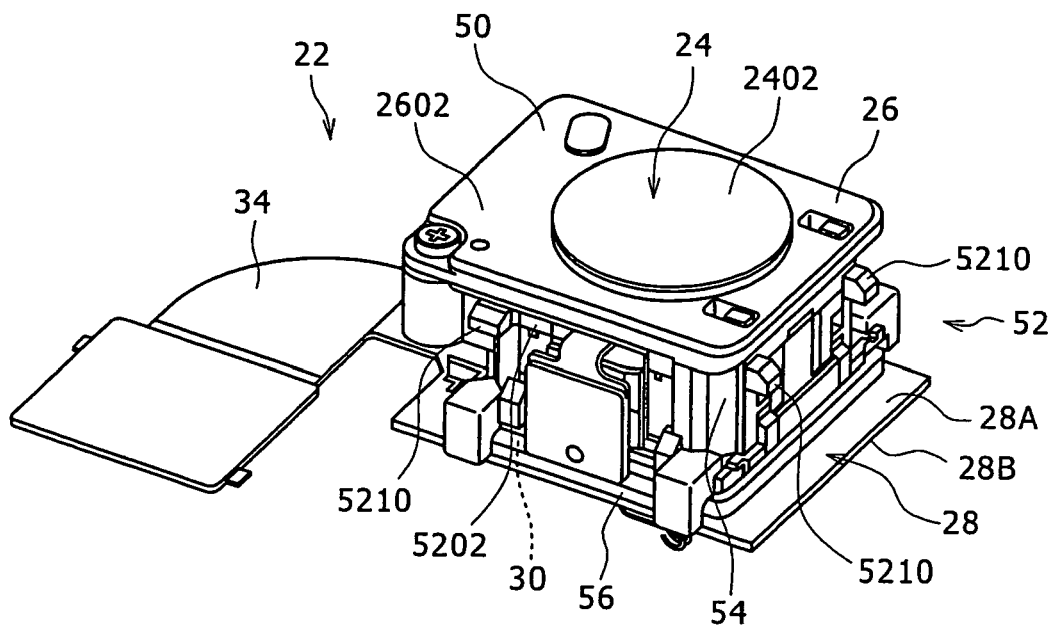
FIGS. 5A and 5B are perspective views of the camera module from which a shield case has been detached.
Figure 5B:
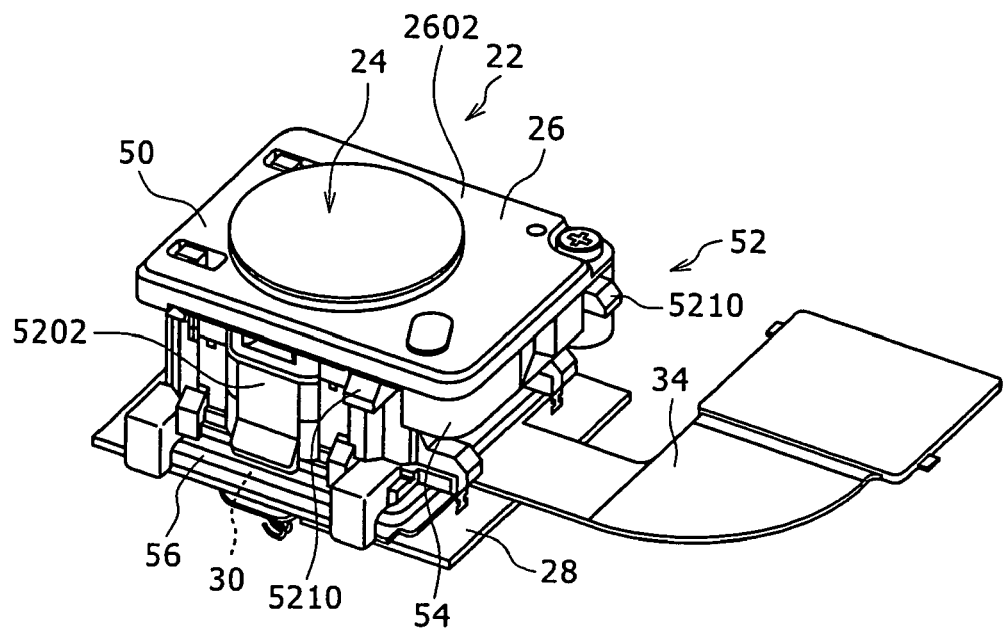
Figure 6A:
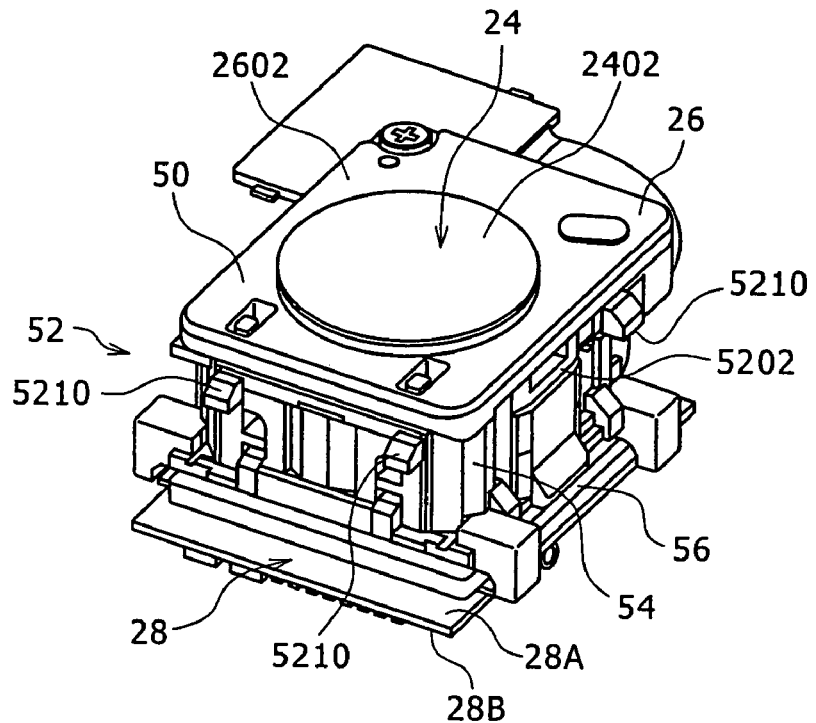
FIGS. 6A and 6B are perspective views of the camera module from which the shield case has been detached.
Figure 6B:
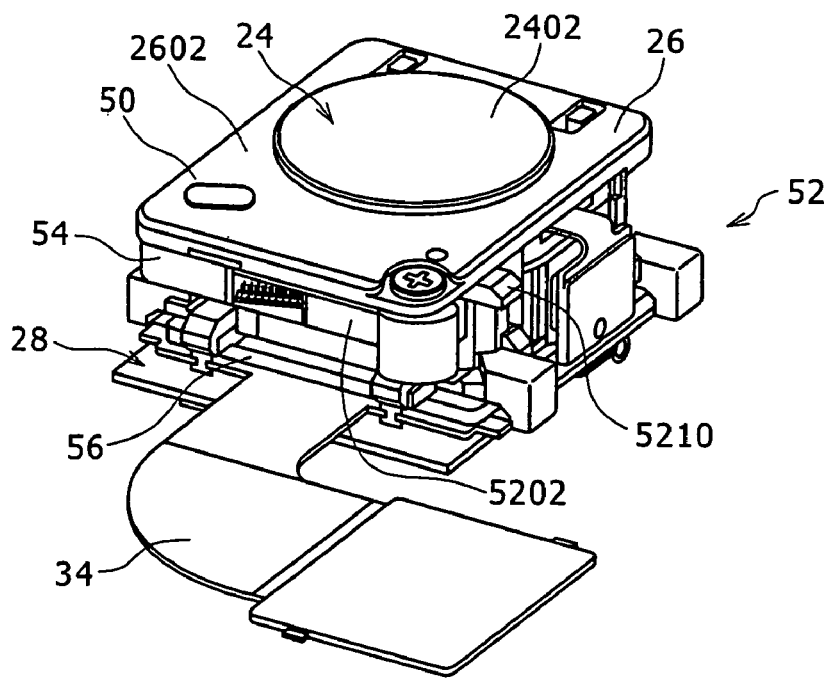
Figure 7:
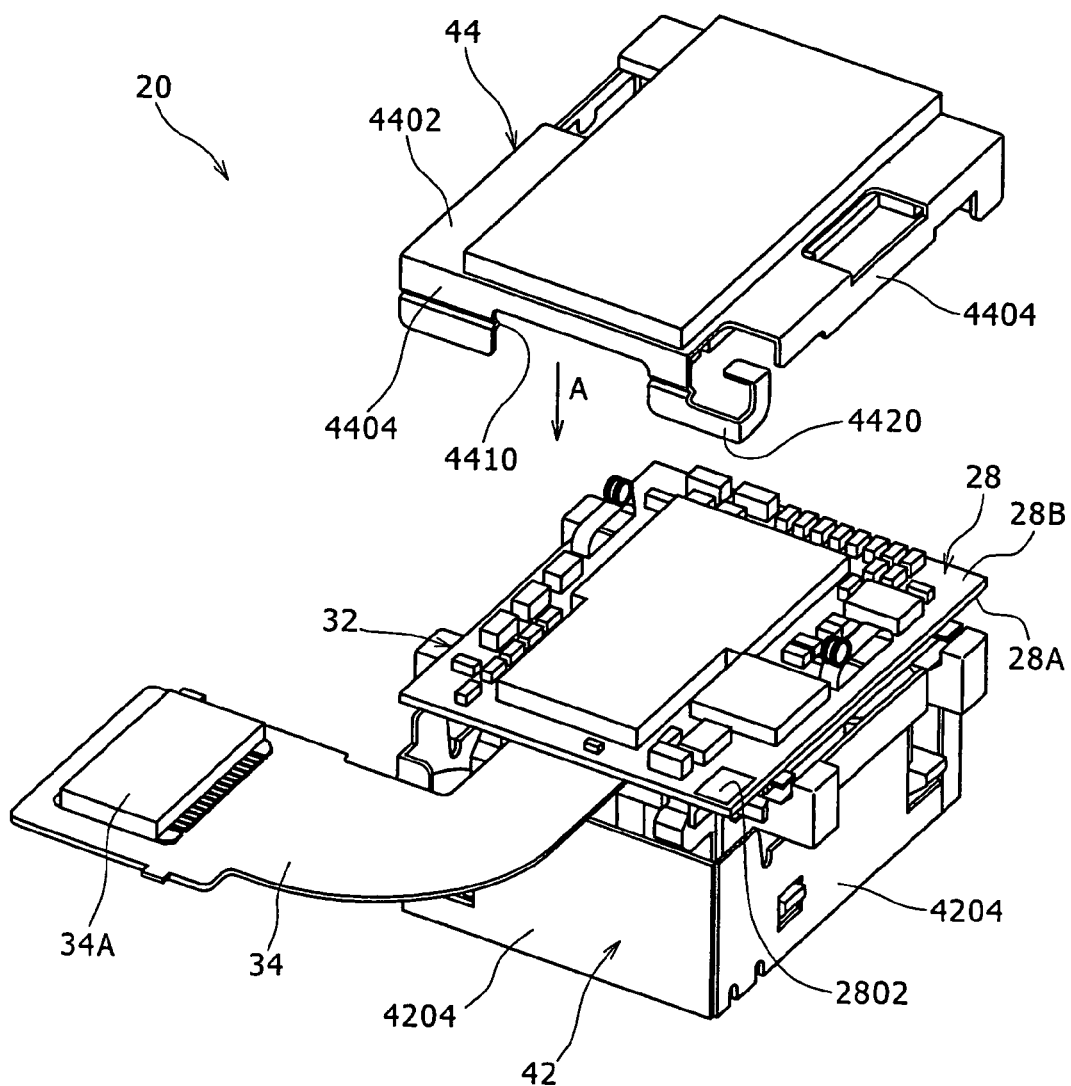
FIG. 7 is a perspective view of the camera module, with a rear split body detached therefrom

As shown in FIGS. 4, 5A and 5B, the camera body 22 includes a lens-barrel 26 holding a shooting optical system 24, a substrate 28 attached to the lens-barrel 26, an image pickup device 30 incorporated in the lens-barrel 26 and operative to pick up an image focused by the shooting optical system 24 and to output an image pickup signal, and a signal processing unit 32 provided on the substrate 28 and operative to receive the image pickup signal outputted from the image pickup device 30 and to perform a predetermined signal processing (see FIGS. 7 and 8.

The lens-barrel 26 has a front end and a rear end at both side positions along the optical axis of the shooting optical system 24, and an optical member 2402 (in this embodiment, a lens cover) constituting the shooting optical system 24 and located at a frontmost position is disposed in the state of being exposed at the front end of the lens-barrel 26.

The lens-barrel 26 is rectangular in shape, and is provided in its center with a containing space penetrating therethrough in the front-rear direction, in other words, extending along the optical axis of the shooting optical system 24.

FIG. 7 is a perspective view of the camera module 20, with a rear split body 44 detached therefrom, and FIG. 8 is a view along arrow A of FIG. 7.

As shown in FIGS. 5 to 8, the substrate 28 is attached to the rear end of the lens-barrel 26.

The substrate 28 is rectangular in shape, and includes a front surface 28A fronting on the lens-barrel 26, and a rear surface 28B located on the opposite side.

The substrate 28 is formed with a profile greater than that of the rear surface constituting the rear end of the lens-barrel 26, and the four side portions of the substrate 28 protrude to the outside of the four sides of the rear surface of the lens-barrel 26.

A flexible substrate 34 is laid on the front surface 28A and attached to the front surface 28A by soldering, and an image pickup device 30 is mounted in a location where the flexible substrate 34 fronts on the lens-barrel 26.

Electronic component parts inclusive of various ICs and the like constituting the signal processing unit 32 are mounted on the rear surface 28B.

Besides, the rear surface 28B is provided with a ground land 2802 set at a reference potential.

Incidentally, in FIGS. 7 and 8, symbol 34A denotes a connector provided at the tip end of the flexible substrate 34.

Figure 9:
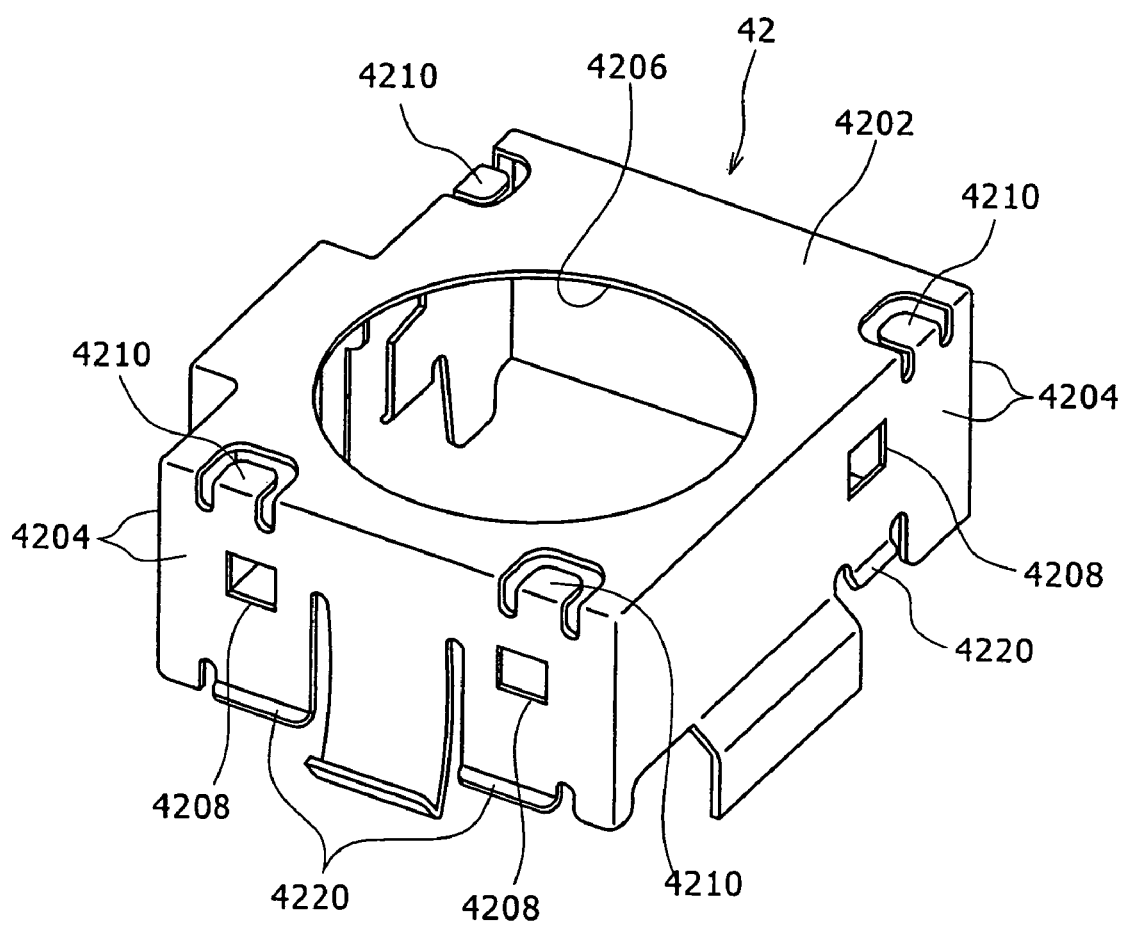
FIG. 9 is a perspective view of a front split body 42 constituting the shield case.
Figure 10A:
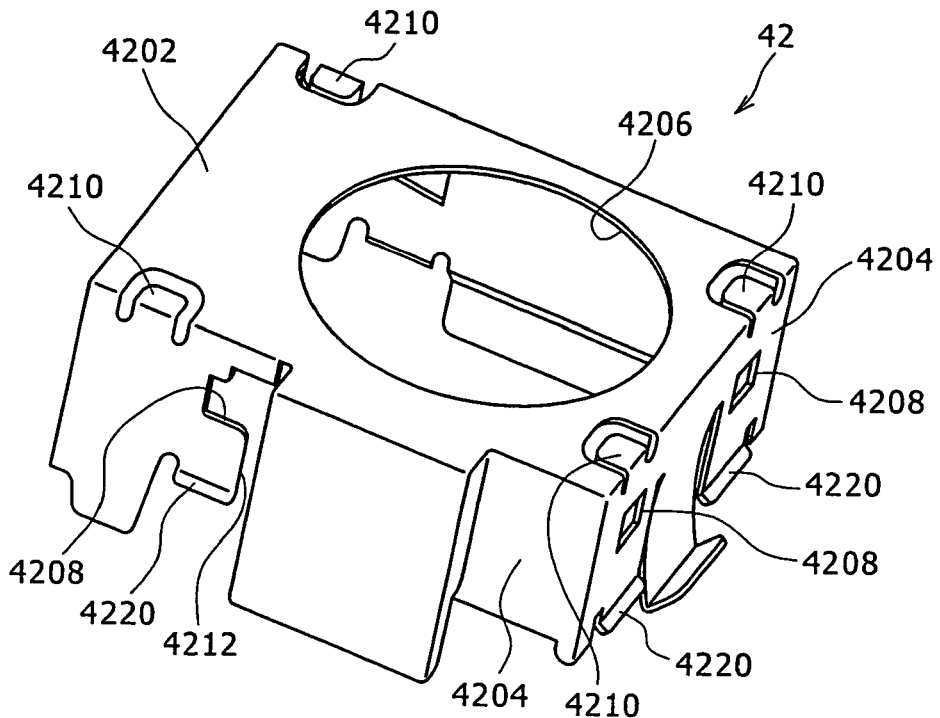
FIGS. 10A and 10B are perspective views of the front split body constituting the shield case.
Figure 10B:
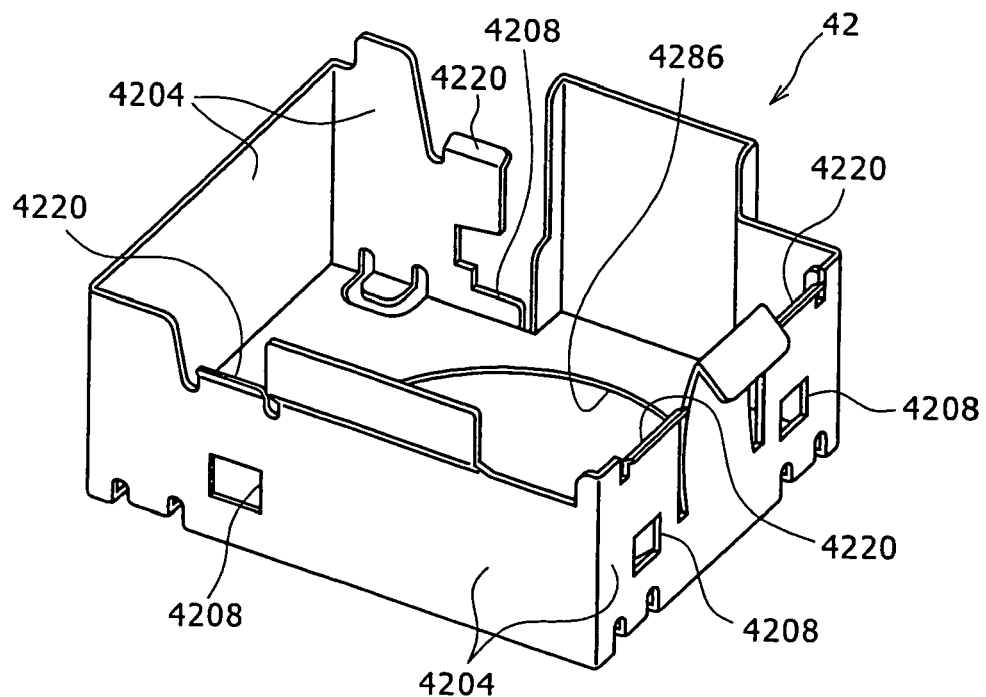
Figure 11A:
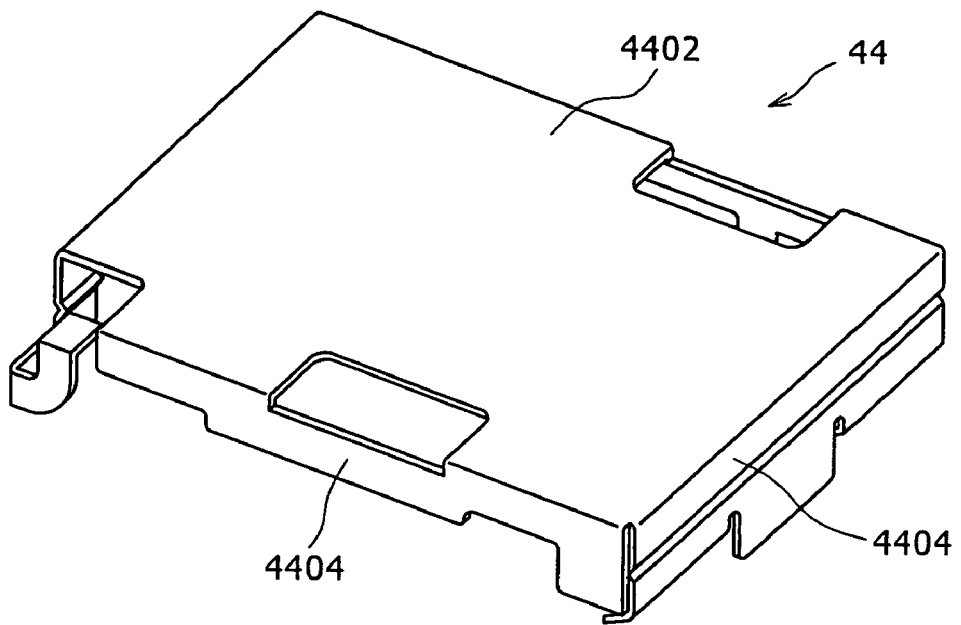
FIG. 11A is a perspective view of the rear split body constituting the shield case.
Figure 11B:
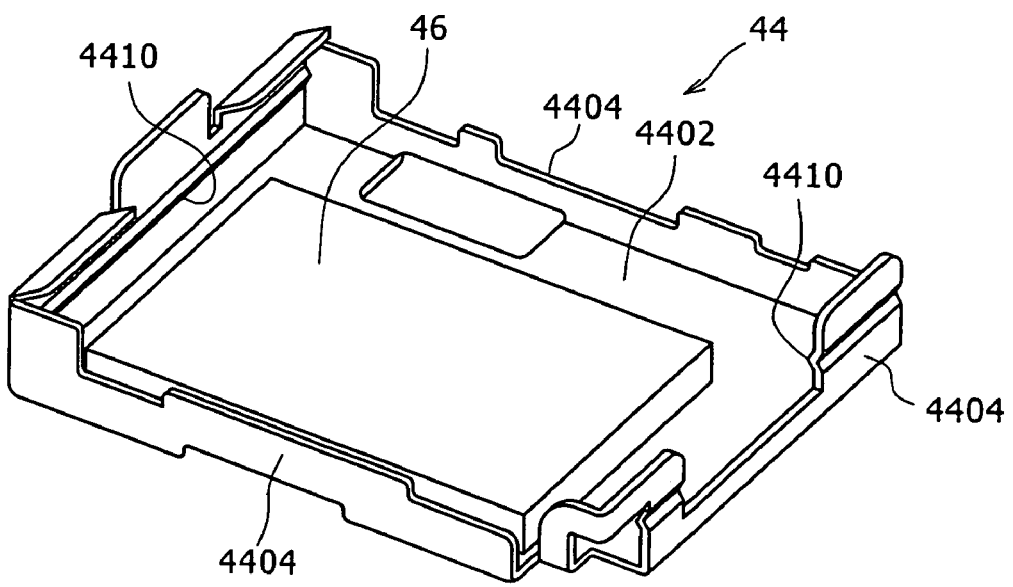
FIG. 11B is a perspective view, from inside, of the rear split body constituting the shield case.

FIG. 9, 10A and 10B are perspective views of a front split body 42 constituting the shield case 40, FIG. 11A is a perspective view of the rear split body 44 constituting the shield case 40, and FIG. 11B is a perspective view, from inside, of the rear split body 44 constituting the shield case 40.

The shield case 40 is configured to cover the lens-barrel 26 and the substrate 28 and to provide electromagnetic shielding for the image pickup device 30 and the signal processing unit 32.

The shield case 40, in this embodiment, is composed of the front split body 42 covering a front portion of the lens-barrel 26, and the rear split body 44 covering a rear portion of the lens-barrel 26.

The front split body 42 and the rear split body 44 are both formed of an electrically conductive and non-magnetic material such as phosphor bronze, nickel silver, tinplate and copper.

First, the rear split body 44 of the shield case 40 will be described as follows.

As shown in FIGS. 11A and 11B, the rear split body 44 has a rectangular substrate covering plate part 4402, and side surface portions 4404 rising up from the four sides of the substrate covering plate part 4402 and extending along the side portions of the lens-barrel 26.

Of the two opposed pairs of side surface portions 4404, one opposed pair of side surface portions 4404 are provided with lock parts 4410 which are disengageably locked to the front surface 28A of the substrate 28 and the locking of which inhibits the substrate covering plate part 4402 from moving in a direction of spacing away from the substrate 28.

Figure 12:
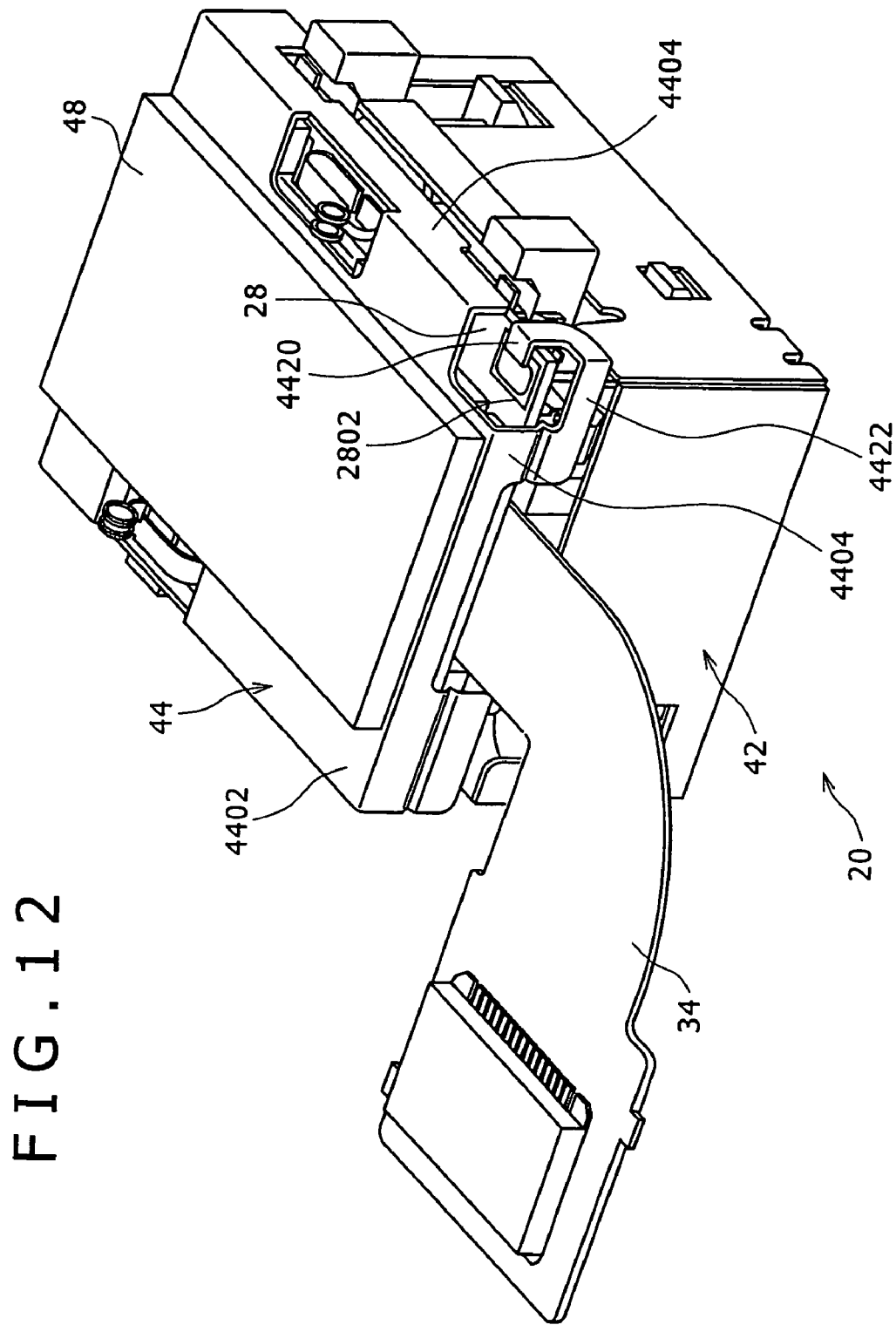
FIG. 12 is a perspective view, from the rear side, of the camera module.
Figure 13:
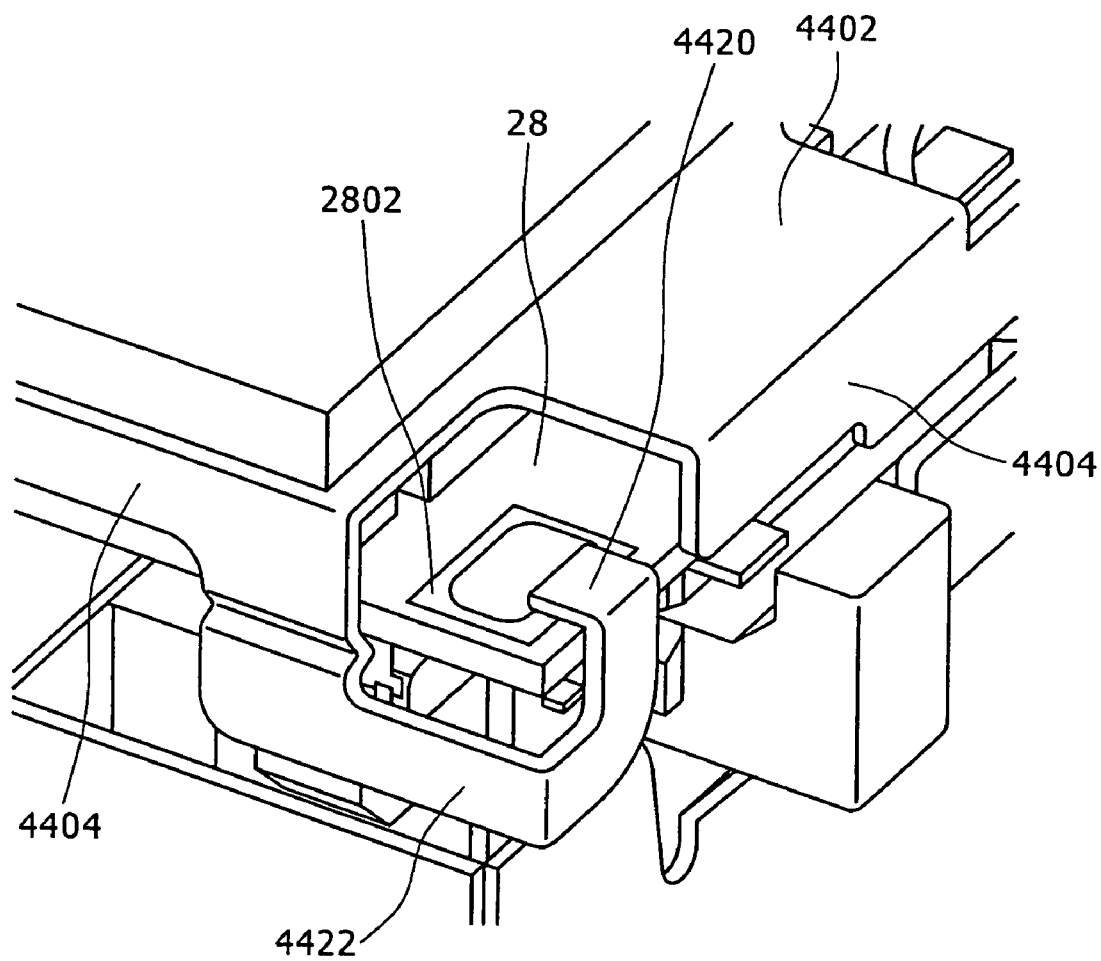
FIG. 13 is an enlarged perspective view of a main part of FIG. 12.

FIG. 12 is a perspective view, from the rear side, of the camera module 20, and FIG. 13 is an enlarged perspective view of a main part of FIG. 12.

A grounding contact piece 4420 for grounding the shield case 40 is provided at the side surface portion 4404.

The grounding contact piece 4420 is projected from the side surface portion 4404, extends in a direction intersecting with the direction of spacing away and approaching of the substrate covering plate part 4402 relative to the substrate 28, and has a tip portion joined to the ground land 2802 by soldering.

Specifically, the side surface portion 4404 is provided with an arm portion 4422 which projects from the side surface portion 4404, extends in a direction intersecting with the direction of spacing away and approaching of the substrate covering plate part 4402 relative to the substrate 28, and is elastically deformable in the direction of spacing away and approaching of the substrate covering plate part 4402 relative to the substrate 28. The grounding contact piece 4420 is provided at the tip end of the arm portion 4422.

As shown in FIGS. 4 and 11B, an insulating and elastic cushion material 46 is disposed between the substrate 28 and the substrate covering plate part 4402.

As the cushion material 46, there can be used an insulating and non-magnetic material, for example, foamed polyurethane or the like. Incidentally, foamed polyurethane is higher than air in thermal conductivity.

Besides, as shown in FIG. 4, with the lock parts 4410 locked to the camera body 22 (in this embodiment, the front surface 28A of the substrate 28), the cushion material 46 is disposed in a compressed state between the substrate 28 and the substrate covering plate part 4402.

In other words, the lock parts 4410 are normally locked to the camera body 22 by the elastic force of the cushion material 46, whereby the rear split body 44 is mounted on the camera body 22 without possibility of chattering.

The cushion material 46 is composed of a plate-like member having a uniform thickness, so that the substrate 28 and the substrate covering plate part 4402 are parallel to each other.

Figure 14:
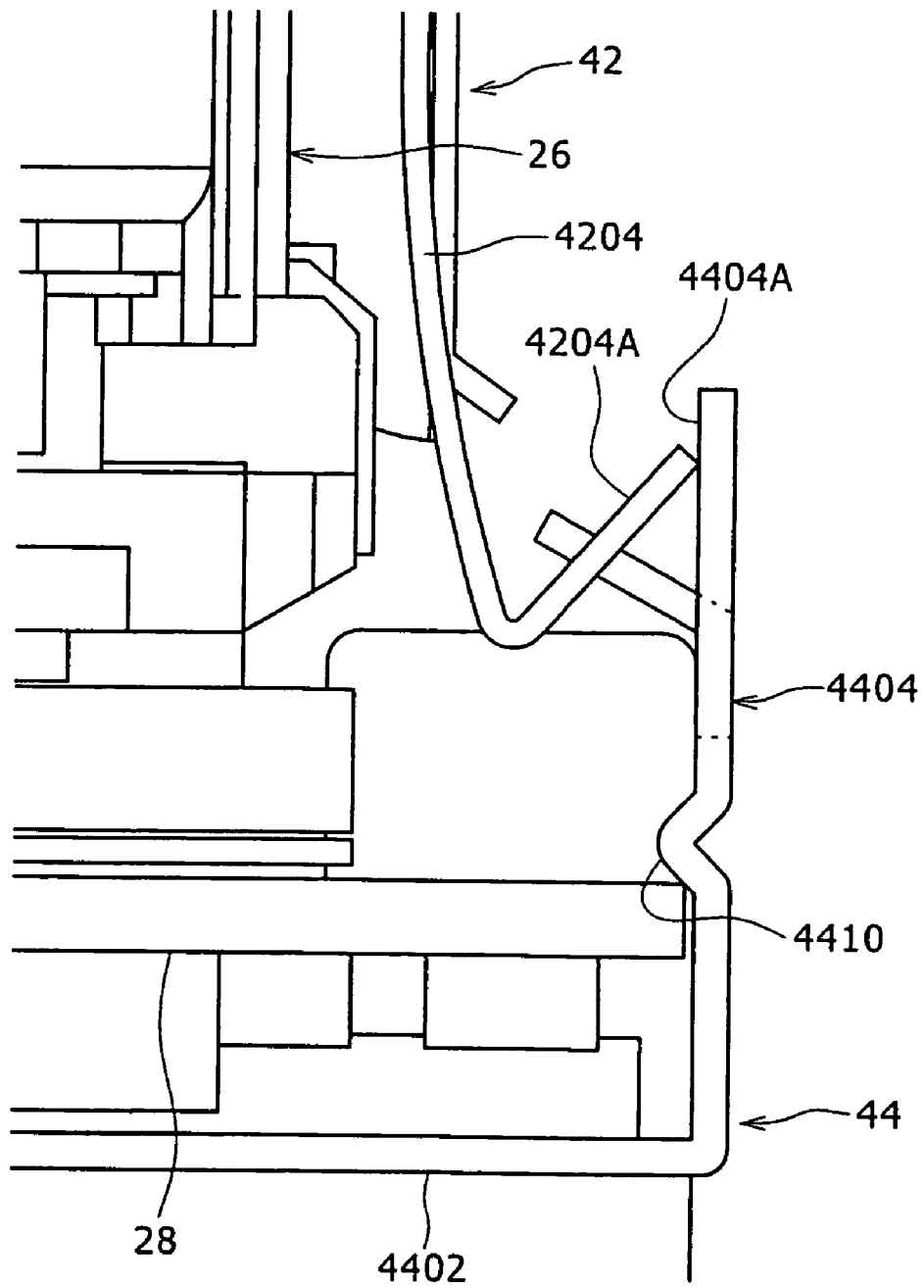
FIG. 14 is an enlarged view of main parts of the front split body and the rear split body.

FIG. 14 is an enlarged view of main parts of the front split body 42 and the rear split body 44.

As shown in FIG. 14, in the condition where the front split body 42 and the rear split body 44 are mounted on the camera body 22, a part 4204A of the tip end of the side surface portion 4204 of the front split body 42 and a part 4404A of the tip end of the side surface portion 4404 of the rear split body 44 make elastic contact with each other, whereby the front split body 42 and the rear split body 44 are electrically connected to each other.

Besides, in this embodiment, as shown in FIG. 4, in incorporating the camera module 20 into a base end portion of the first casing 14, a plate-like rubber vibration isolator 48 is interposed on the outside surface of the substrate covering plate part 4402, and four leg parts 5250 (see FIG. 18) projected from the lens-barrel body 52 are attached to an inside wall 1410 of the first casing 14, whereby the camera module 20 is disposed in position. To be more specific, the four leg parts 5250 projected from the lens-barrel body 52 are engaged with engaging parts of the inside wall 1410 of the first casing 14, whereby the rubber vibration isolator 48 is mounted in a compressed state and is made to display a cushioning action so as to prevent the rear split body 44 from slipping out of position.

With such a rear split body 44 provided, the following effects are displayed.

Even if an impact is exerted on the camera module 20 due to dropping of the cellular phone 10 or the like, the presence of the cushion material 46 interposed between the substrate covering plate part 4402 and the substrate 28, in addition to the cushioning action of the rubber vibration isolator 48, ensures that the cushioning action of the cushion material 46 prevents an irrational force from acting on the portion between the rear split body 44 and the substrate 28, which is advantageous in securing the impact resistance of the camera module 20.

In addition, since the cushion material 46 is disposed in a compressed state between the substrate 28 and the substrate covering plate part 4402 and the lock part 4410 is normally locked to the camera body 22 by the elastic force of the cushion material 46, this configuration is advantageous in mounting the rear split body 44 on the camera body 22 without possibility of chattering.

Besides, since the rear split body 44 is joined to the ground land 2802 of the substrate 28 through the arm part 4422 and the grounding contact piece 4420, an impact force will be damped by flexure of the arm part 4422 when an impact is exerted on the camera module 20. Therefore, an irrational force would not act on the joint portion between the grounding contact piece 4420 and the ground land 2802, which is advantageous in securing the shock resistance of the joint portion between the grounding contact piece 4420 and the ground land 2802.

Further, where the cushion material 46 is composed of a material higher than air in thermal conductivity, such as foamed polyurethane, the heat generated in the substrate 28 will easily be transferred to the rear split body 44 through the cushion material 46, which is advantageous for efficient cooling of the substrate 28.

Incidentally, the grounding contact piece 4420 put in contact with the ground land 2802 may be configured as follows.

Figure 15:
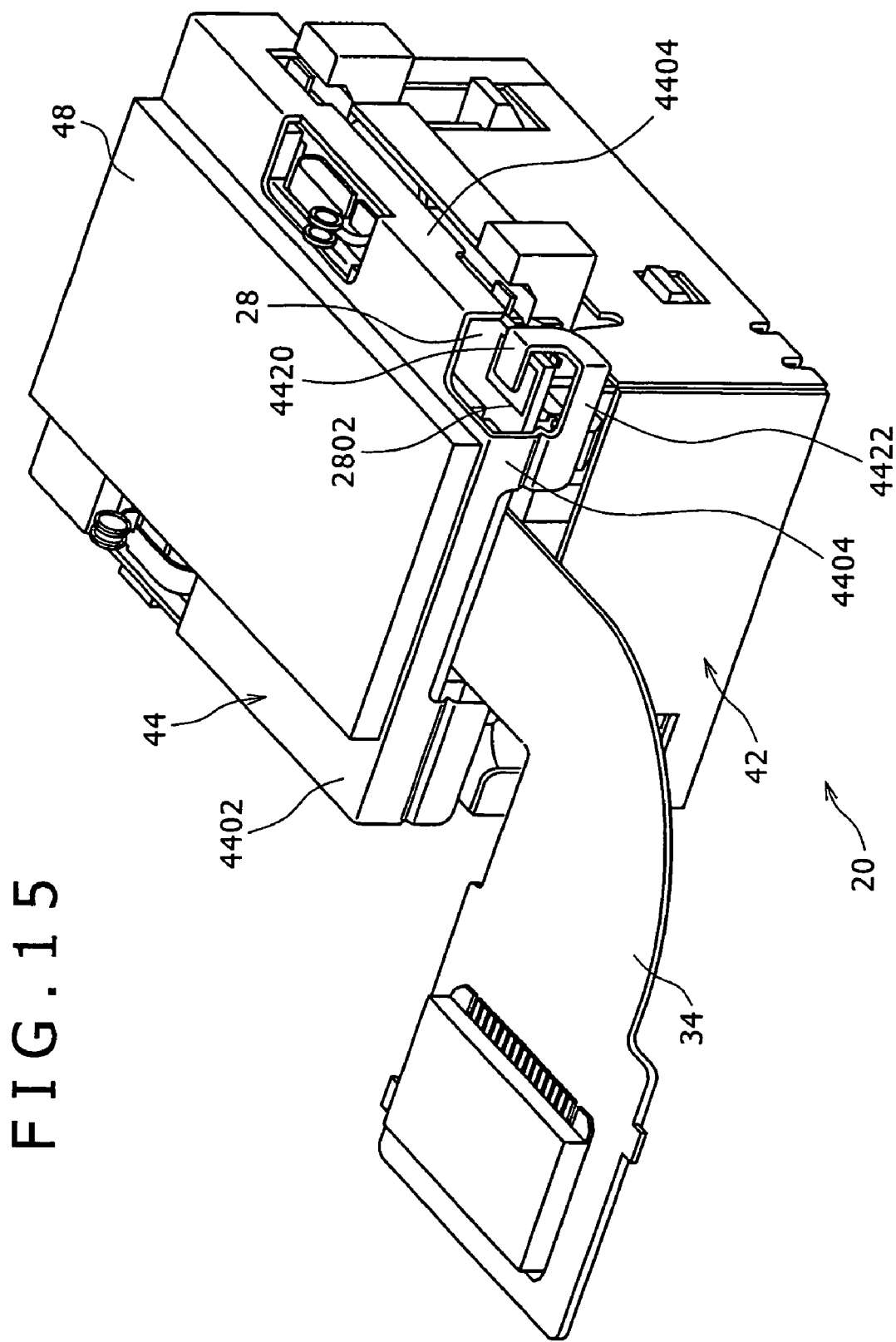
FIG. 15 is a perspective view, from the rear side, of the camera module.
Figure 16:
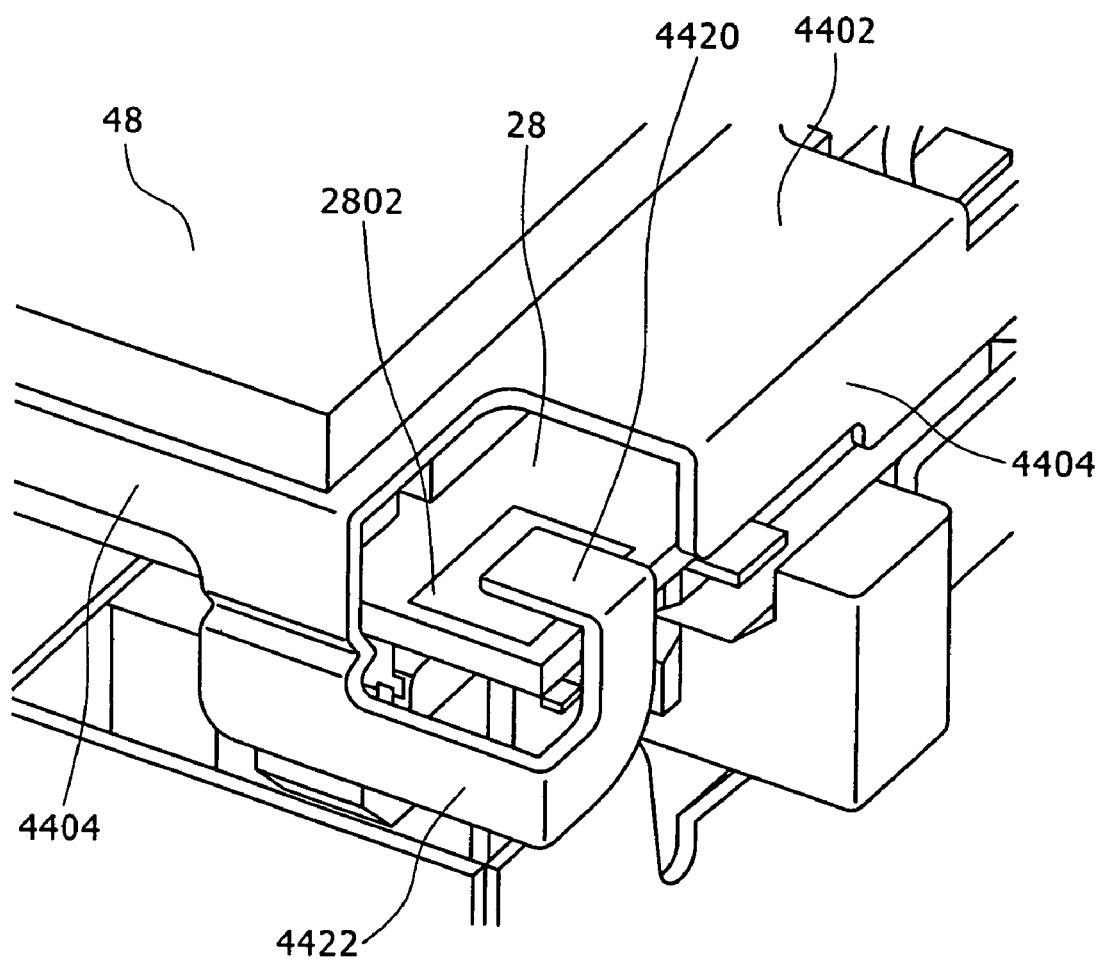
FIG. 16 is an enlarged perspective view of a main part of FIG. 15.

FIG. 15 is a perspective view, from the rear side, of a camera module, and FIG. 16 is an enlarged perspective view of a main part of FIG. 15.

While the grounding contact piece 4420 and the ground land 2802 are joined to each other by soldering in the above-described embodiment, in this embodiment a grounding contact piece 4420 and the ground land 2802 are normally kept in contact with each other by utilizing the elasticity of the arm part 4422; other points of configuration in this embodiment are the same as in the above-described embodiment.

In this embodiment, the arm part 4422 is provided which projects from the side surface portion 4404, extends in a direction intersecting the direction of spacing away and approaching of the substrate covering plate part 4402 relative to the substrate 28, and is deformable in the direction of spacing away and approaching of the substrate covering plate part 4402 relative to the substrate 28.

The arm part 4422 is provided at its tip end with the grounding contact piece 4420 capable of making contact with the ground land 2802.

The grounding contact piece 4420 is put into contact with the ground land 2802 and the contact condition is maintained, by the elasticity of the arm part 4422.

According to such a grounding contact piece 4420, the need for a soldering work is eliminated, which is advantageous in contriving a simpler assemblage, as compared with the case where the grounding contact piece 4420 and the ground land 2802 are soldered to each other.

In addition, since the grounding contact piece 4420 and the ground land 2802 are not fixed rigidly, the force exerted on the joint portion between the grounding contact piece 4420 and the ground land 2802 can be lessened, which is more advantageous in securing the shock resistance of the joint portion between the grounding contact piece 4420 and the ground land 2802.

Besides, the lock part 4410 may be locked to the front split body 42.

Figure 17:
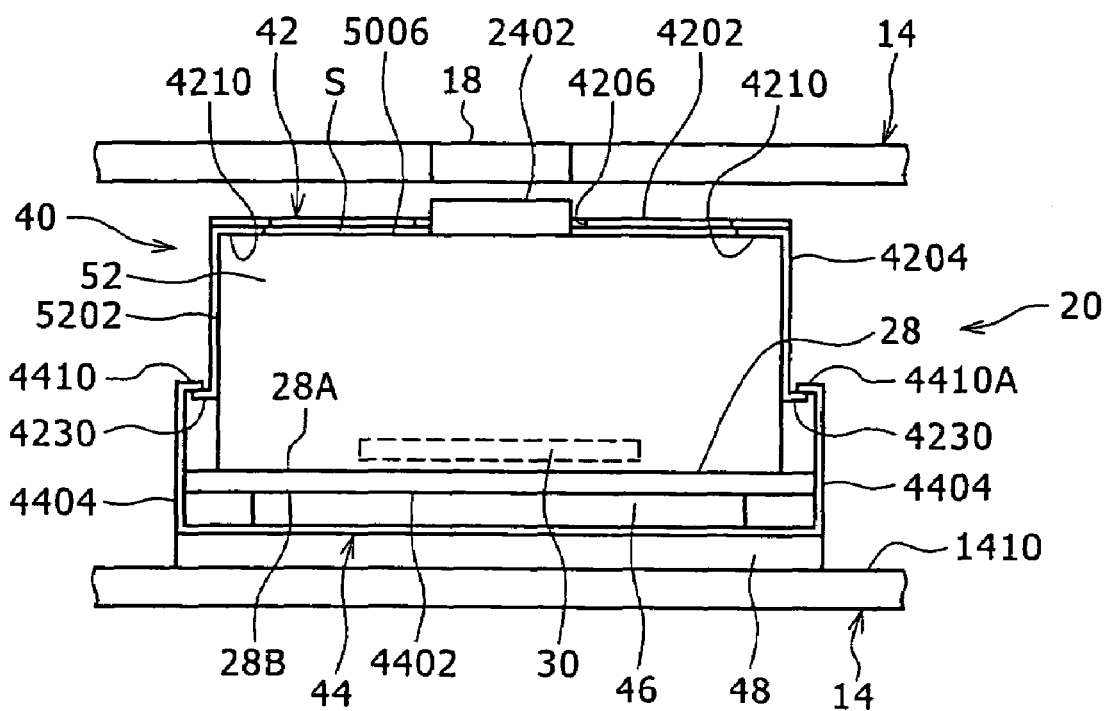
FIG. 17 is a sectional view of the camera module.

FIG. 17 is a sectional view of a camera module 20 in the state of being incorporated in a first casing 14.

While the lock parts 4410 for inhibiting the substrate covering plate part 4402 from moving away from the substrate 28 are locked to the camera body 22 in the above-described embodiment, in this embodiment lock parts 4410A are locked to a front split body 42; the other points of configuration in this embodiment are the same as in the above-described embodiment.

Specifically, the lock parts 4410A are provided at tip ends of one pair of side surface portions 4404 of two opposed pairs of side surface portions 4404 of the rear split body 44.

The lock parts 4410A can be locked to lock parts 4230 of the front split body 42, and, by the locking of the lock parts 4410A to the lock parts 4230 of the front split body 42, the substrate covering plate part 4402 is inhibited from moving away from the substrate 28.

In addition, a plate-like rubber vibration isolator 48 is interposed on the outside surface of the substrate covering plate part 4402, and four leg portions 5250 (see FIG. 18) projected from the lens-barrel body 52 are attached to the inside wall 1410 of the first casing 14, whereby the camera module 20 is disposed in position.

By such lock parts 4410, also, the same effects as in the above-described embodiment are displayed.

Incidentally, while the case where an elastic and insulating plate-like member is used as the cushion material 46 has been described, a single or a plurality of coil springs formed from an elastic and insulating wire or the like can be used as the cushion material 46. However, the use of the plate-like member as in the above-described embodiment is advantageous in contriving a simpler structure and an easier assemblage.

Now, the portion of the lens-barrel 26 covered with the front split body 42, the front split body 42, and a clamping mechanism 60, which are main parts in the present invention, will be described below.

Figure 18:
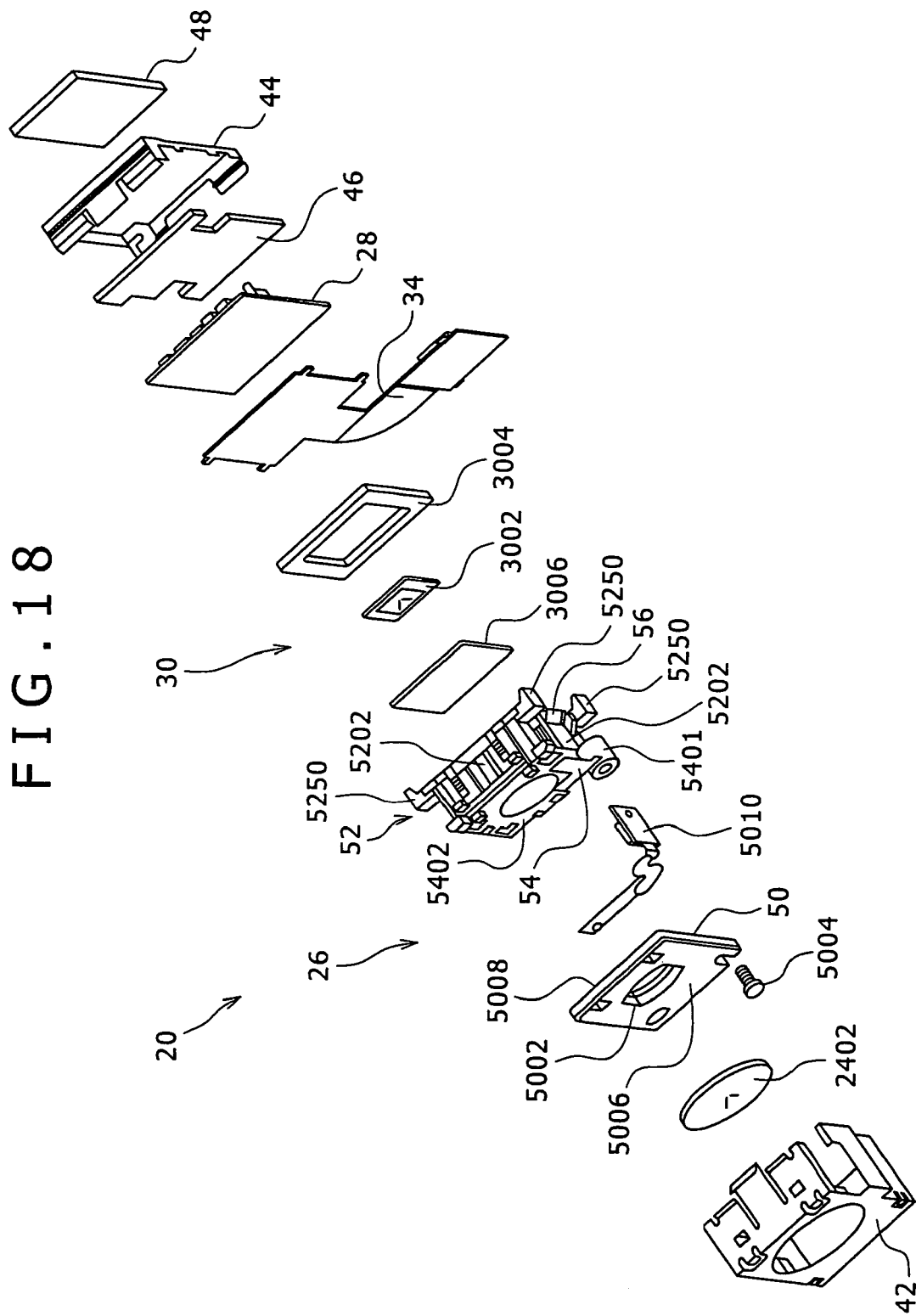
FIG. 18 is an exploded perspective view, from the front side, of the camera module.
Figure 19:
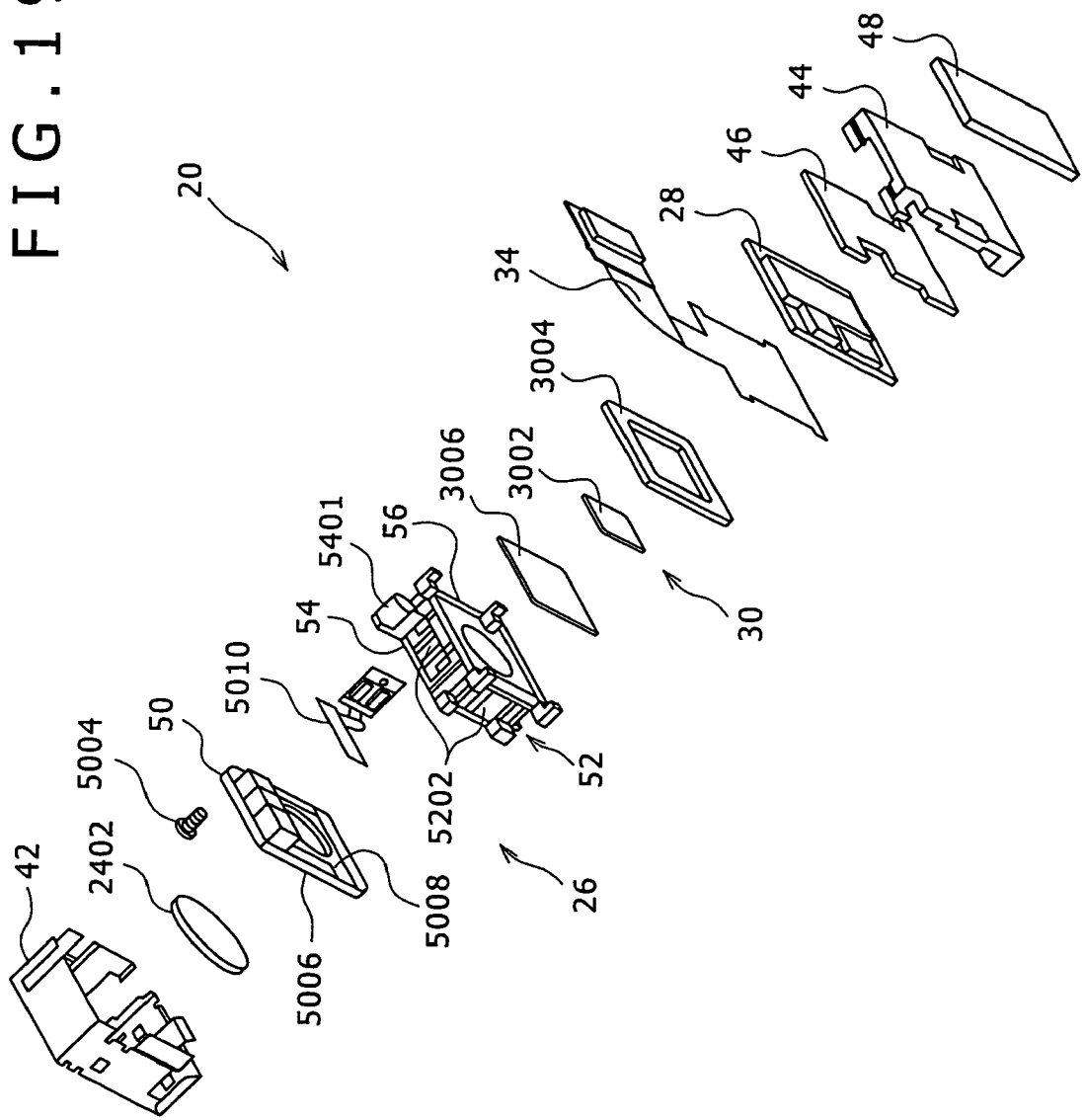
FIG. 19 is an exploded perspective view, from the rear side, of the camera module.

FIG. 18 is an exploded perspective view, from the front side, of the camera module 20, and FIG. 19 is an exploded perspective view, from the rear side, of the camera module 20.

The lens-barrel 26 is configured by stacking a plurality of lens-barrel component members.

Specifically, the lens-barrel 26 is configured by stacking a shutter supporting housing 50 and a lens-barrel body 52 along the optical axis direction of the shooting optical system 24. To be more specific, the lens-barrel body 52 is configured by stacking a front lens-barrel 54 and a rear lens-barrel 56 along the optical axis direction of the shooting optical system 24, and the front lens-barrel 54 and the rear lens-barrel 56 are joined to each other by a UV-curable type adhesive (UV adhesive).

Incidentally, the shutter supporting housing 50 as well as the front lens-barrel 54 and the rear lens-barrel 56 have dispersions of dimensions thereof, but the dispersions are within the respective ranges of permissible errors.

The shutter supporting housing 50 is provided in its center with an aperture 5002 of an optical path of the shooting optical system 24, and a shutter (not shown) for opening and closing the aperture 5002 and a shutter driving unit (not shown) are provided in the inside of the shutter supporting housing 50. Incidentally, the shutter supporting housing 50 corresponds to the front end lens-barrel component member located at the front end in the optical axis direction of the shooting optical system, of the plurality of lens-barrel component members stacked together, in the present invention.

The shutter supporting housing 50 is connected to a boss part 5401 of the front lens-barrel 54 by a screw 5004, in the state of being positioned relative to the front lens-barrel 54.

Of the shutter supporting housing 50, a portion on the opposite side of the front lens-barrel 54 is formed as a flat front surface 5006, and a portion on the opposite side of the front surface 5006 is formed as a flat rear surface 5008.

An optical member 2402 (lens cover) constituting the shooting optical system 24 and located at the frontmost end in the optical axis direction of the shooting optical system 24 is attached to the front surface 5006 by a double sided pressure sensitive adhesive tape so as to close the aperture 5002.

In FIG. 18, symbol 5010 denotes a flexible substrate configured to control the above-mentioned shutter driving unit.

The front lens-barrel 54 has a front surface 5402 mated to the rear surface 5008 of the shutter supporting housing 50, and the front surface 5402 is rectangular in shape.

Therefore, a front portion of the lens-barrel body 52 has a front surface 5006, and side portions of the lens-barrel body 52 have four side surfaces 5202 corresponding to the four sides of the front surface 5006.

As shown in FIGS. 5 and 6, of the four side surfaces 5202, one side surface 5202 is projectingly provided with two lock projections 5210, the remaining two side surfaces 5202 are each provided with a single lock projection 5210, and the remaining one side surface is not provided with such a projection. In this embodiment, the lock projections 5210 are provided in the front lens-barrel 54.

Incidentally, in FIGS. 18 and 19, symbol 3002 denotes a CMOS sensor as an image pickup sensor mounted on the flexible substrate 34 and operative to pick up an image of an object and to produce an image pickup signal, symbol 3004 denotes a rectangular package attached to the flexible substrate 34 so as to contain the CMOS sensor 3002, and symbol 3006 denotes a cover glass covering the front surface of the package 3004 and sealing the CMOS sensor 3002 in the package 3004. The CMOS sensor 3002, the package 3004, and the cover glass 3006 constitute the image pickup device 30. Incidentally, while the CMOS sensor 3002 is used as the image pickup sensor in this embodiment, the present invention is not limited to this configuration, and, naturally, a CCD sensor or other known sensors can also be used.

As shown in FIGS. 4, 9, 10A and 10B, the front split body 42 has a rectangular front surface covering plate part 4202 covering the front surface 5006 of the shutter supporting housing 50, and four side surface portions 4204 bent from the four sides of the front surface covering plate part 4202.

The front surface covering plate part 4202 is provided with an opening 4206 at a position corresponding to the optical member 2402 (lens cover).

In addition, spring pieces 4210 are integrally formed at four positions along the periphery of the front surface covering plate part 4202.

The spring pieces 4210 are each provided over the range from the front surface covering plate part 4202 to the side surface portion 4204 so as to be elastically deformable in the direction of spacing away from and approaching the front surface covering plate part 4202, in other words, to be elastically deformable in the optical axis direction of the shooting optical system 24, and further in other words, to be elastically deformable in the direction of stacking of the plurality of lens-barrel component members.

In this embodiment, two spring pieces 4210 are formed at both ends of one side of the front surface covering plate part 4202, and one spring piece 4210 is formed at an end portion of each of the two sides intersecting with the one side.

The side surface portion 4204 provided with two spring piece 4210 is formed with a locking opening 4208 at a position spaced from the spring piece 4210 along the elastic deformation direction of the spring piece 4210 (along the stacking direction of the plurality of lens-barrel component members).

Besides, the side surface portion 4204 provided with one spring piece 4210 is formed with a locking opening 4208 at a position spaced from the spring piece 4210 along the elastic deformation direction of the spring piece 4210 (along the stacking direction of the plurality of lens-barrel component members).

As shown in FIG. 10A, a vertically extending vertical groove 4212 is provided in a side portion relative to one locking-opening 4208.

As shown in FIGS. 9, 10A and 10B, at an end portion of the side surface portion 4204 passing through each locking opening 4208 in the direction of spacing away from the front surface plate part 4202, a bent piece 4220 bent to the outside of the side surface portion 4204 is provided so that, at the time of mounting the front split body 42 onto the camera body 22 (the lens-barrel body 52), the lock projections 5210 will be smoothly guided to the corresponding locking openings 4208.

Incidentally, in plan view, the profile of the four sides of the shutter supporting housing 50 is slightly larger than the profile of the four side surfaces 5202 of the lens-barrel body 52; therefore, with the inside surfaces of the four side surface portions 4204 abutted on the four sides of the shutter supporting housing 50, the front split body 42 is positioned in the direction orthogonal to the optical axis direction of the shooting optical system 24, and the center of the opening 4206 of the front split body 42 is aligned to the optical axis of the shooting optical system 24 (the center of the optical member 2402 (lens cover)).

Figure 2A:
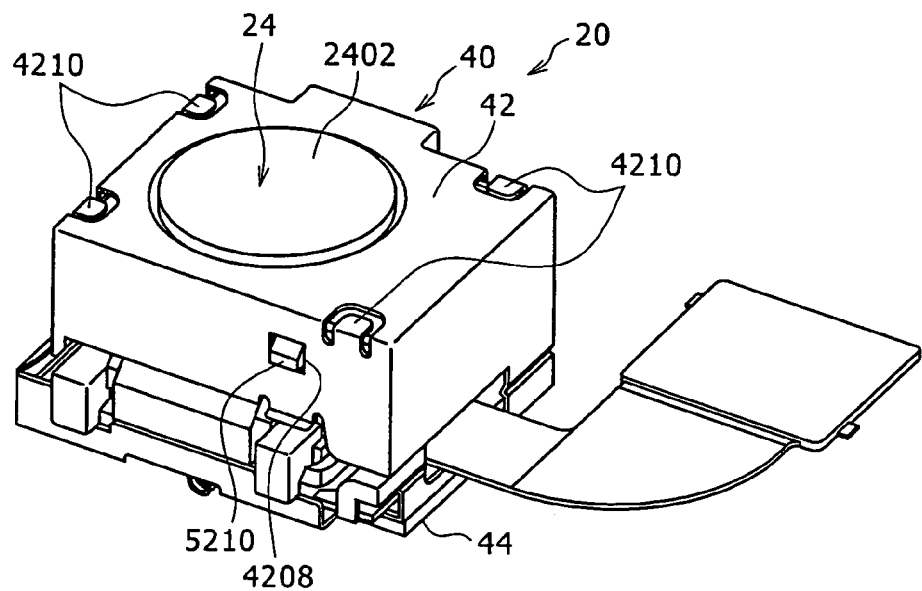
FIGS. 2A and 2B are perspective views of the camera module.
Figure 2B:
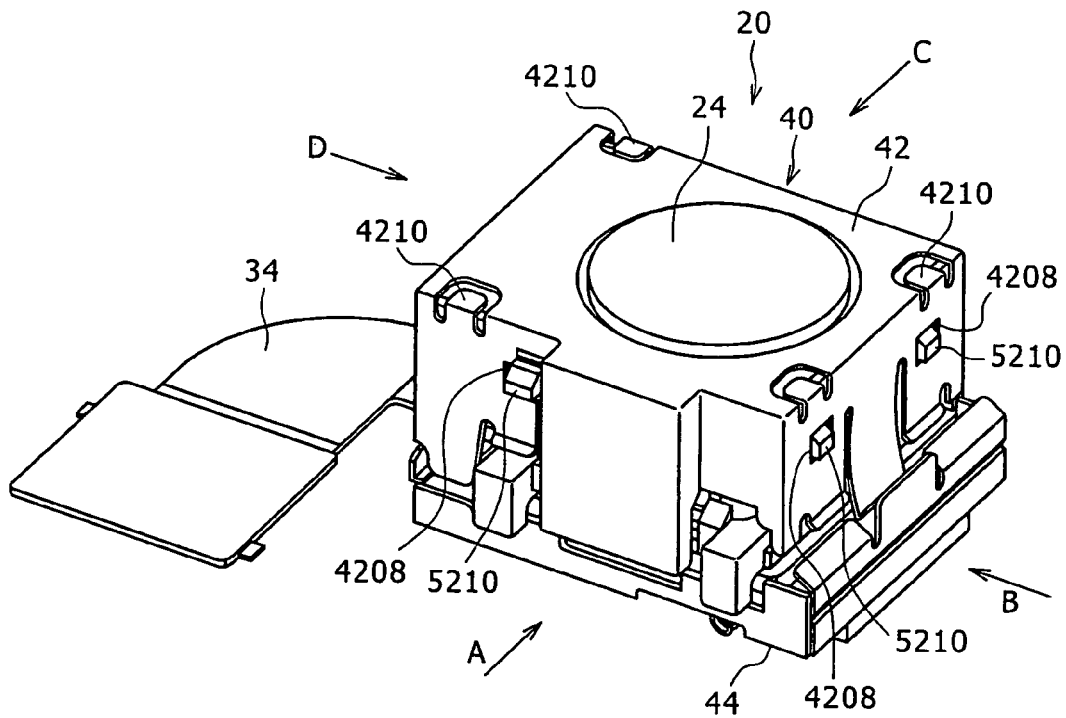
Figure 3A:
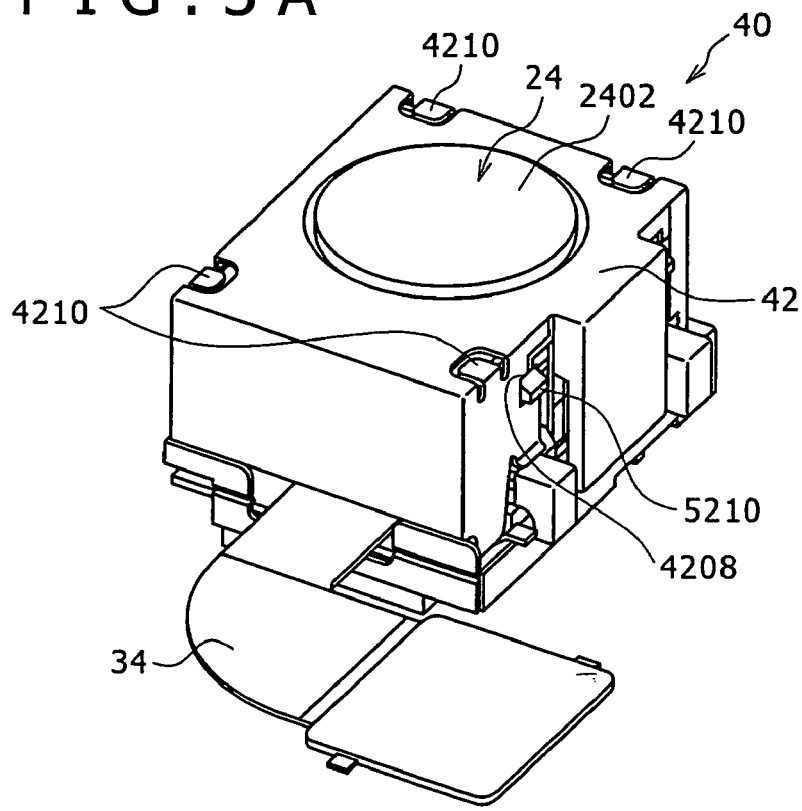
FIGS. 3A and 3B are perspective views of the camera module.
Figure 3B:
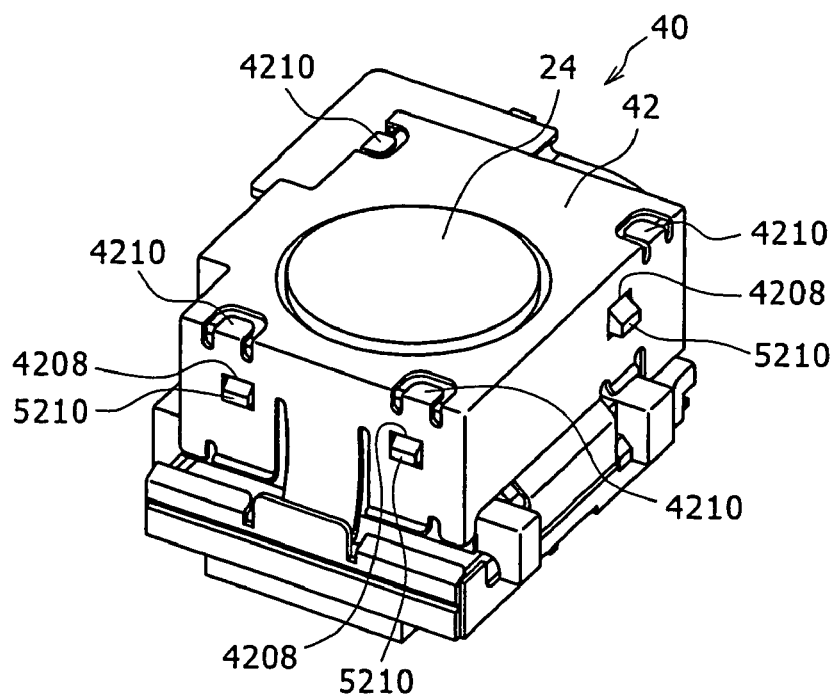
Figure 20:
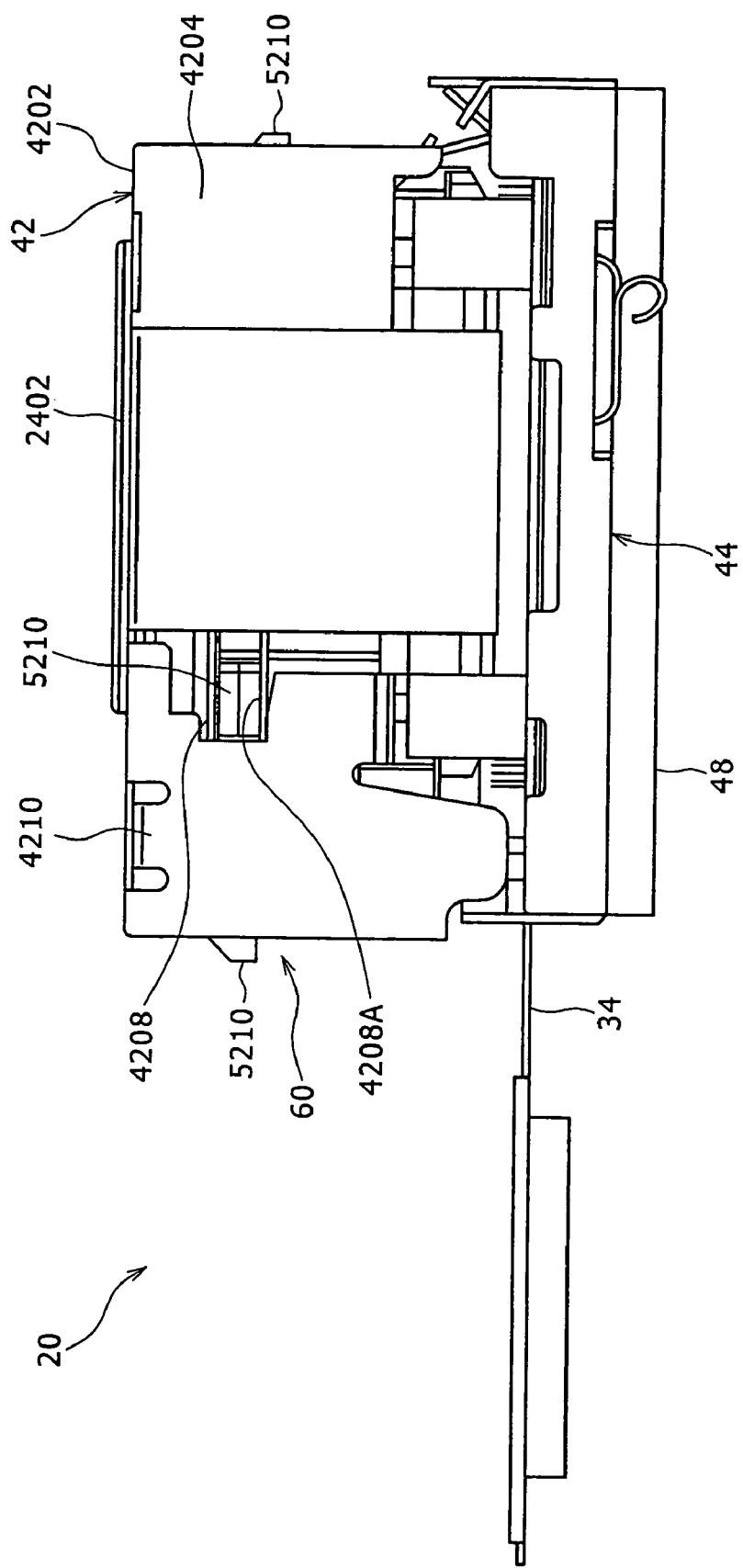
FIG. 20 is a side view showing the condition where the front split body and the rear split body mounted to a lens-barrel (corresponding to a view along arrow A of FIG. 2B)
Figure 21:
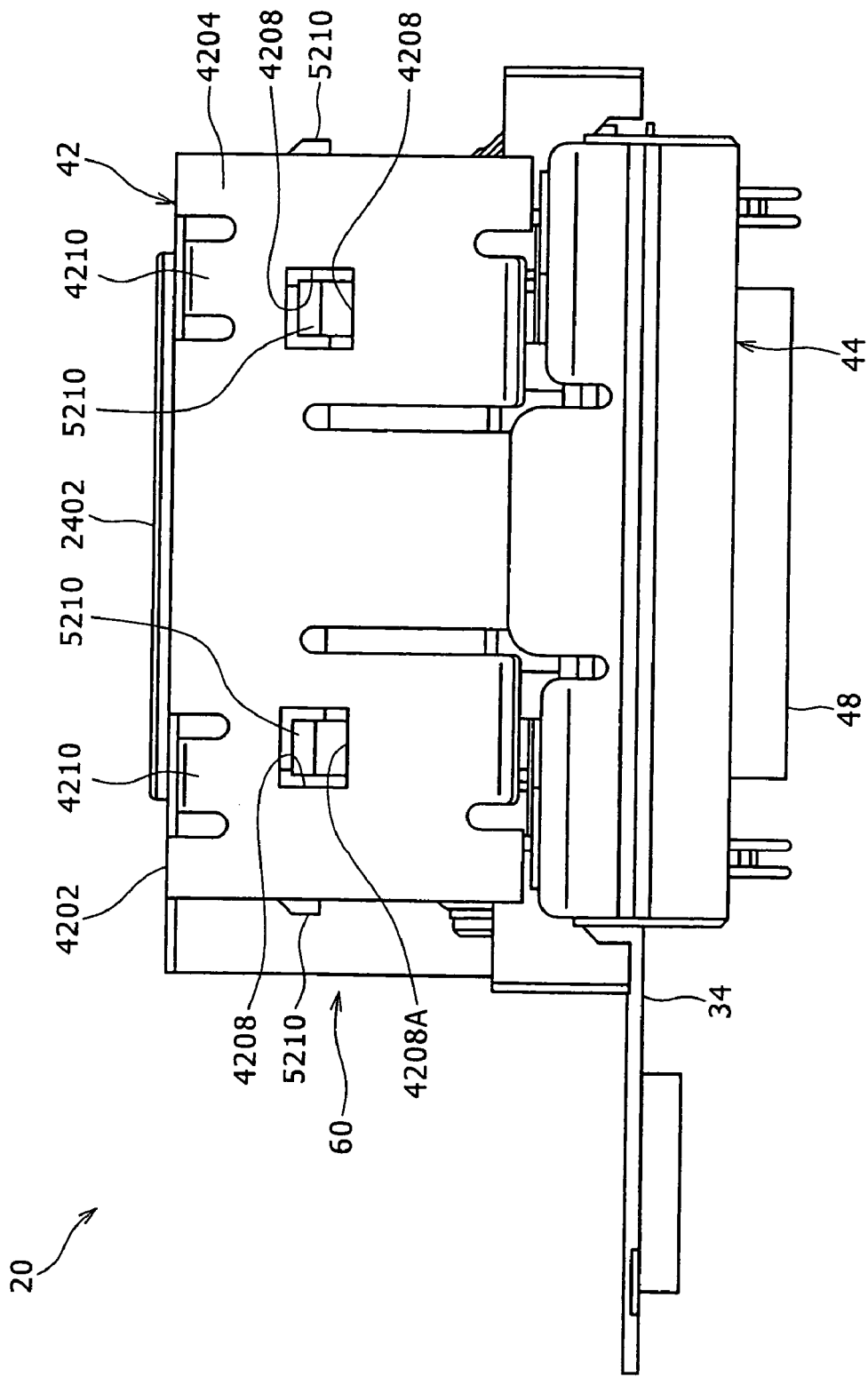
FIG. 21 is a side view showing the condition where the front split body and the rear split body are mounted to the lens-barrel (corresponding to a view along arrow B of FIG. 2B)
Figure 22:
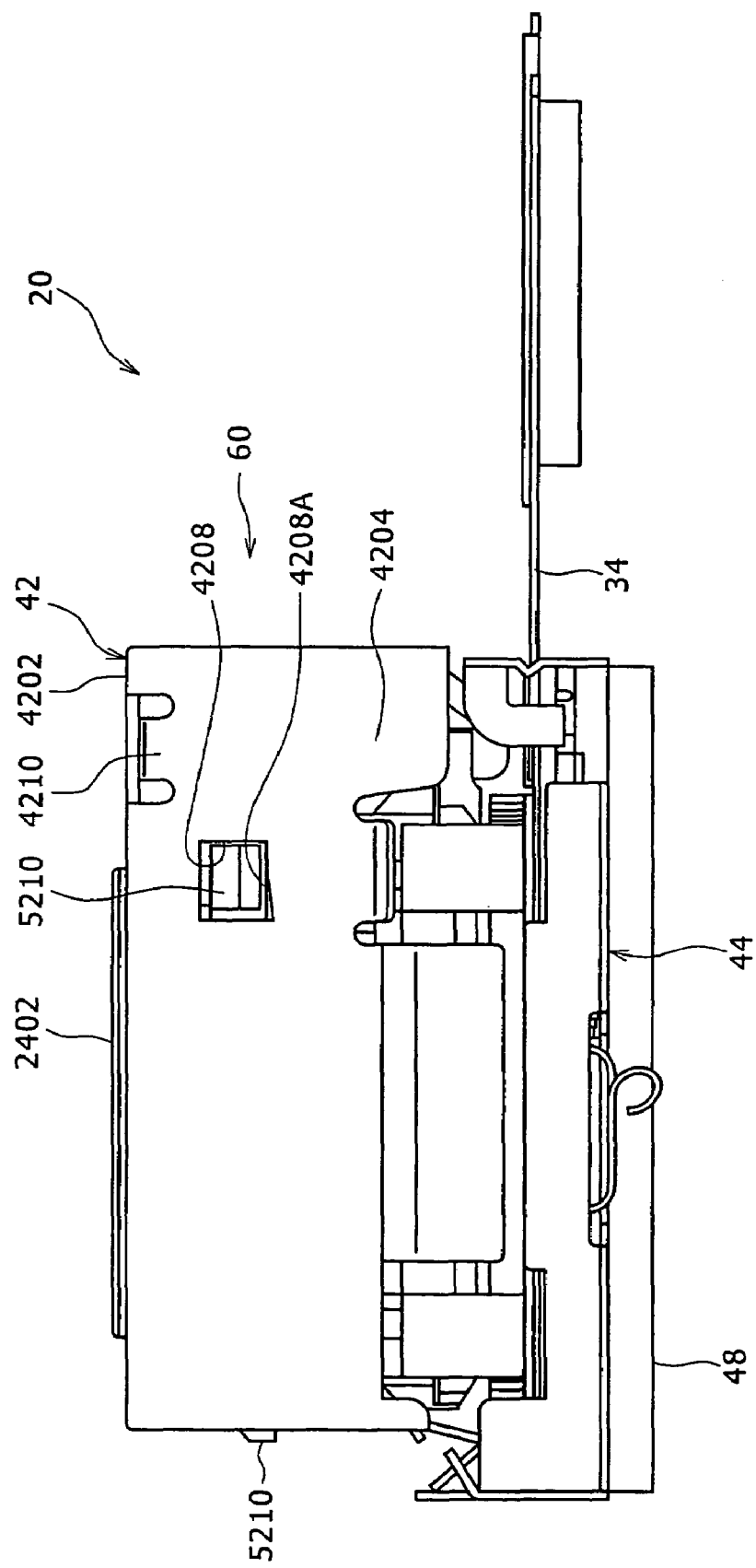
FIG. 22 is a side view showing the condition where the front split body and the rear split body are mounted to the lens-barrel (corresponding to a view along arrow C of FIG. 2B)
Figure 23:
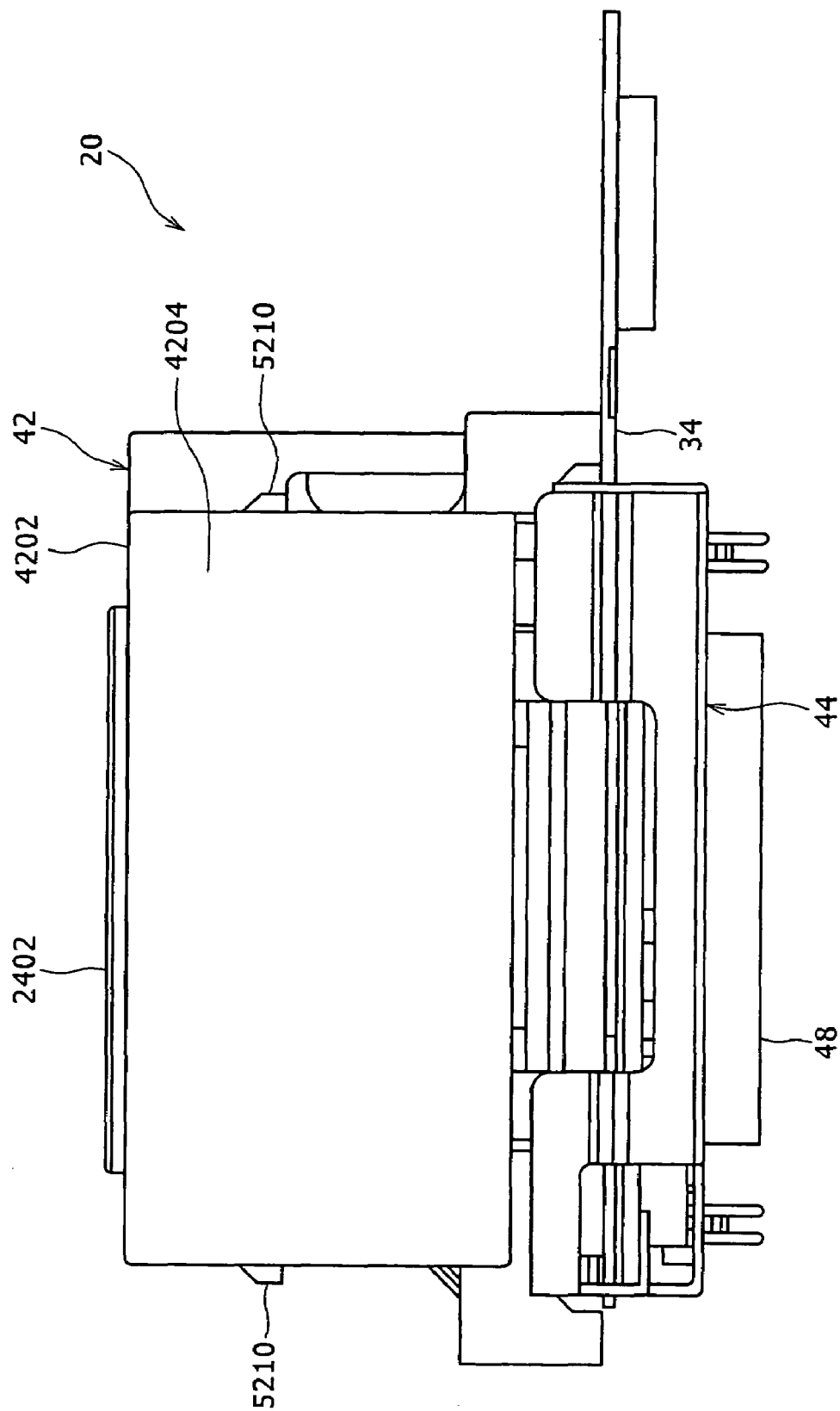
FIG. 23 is a side view showing the condition where the front split body and the rear split body are mounted to the lens-barrel (corresponding to a view along arrow D of FIG. 2B).

FIGS. 20 to 23 are side views showing the condition where the front split body 42 and the rear split body 44 are mounted to the lens-barrel 26, in which FIG. 20 corresponds to a view along arrow A of FIG. 2B, FIG. 21 corresponds to a view along arrow B of FIG. 2B, FIG. 22 corresponds to a view along arrow C of FIG. 2B, and FIG. 23 corresponds to a view along arrow D of FIG. 2B.

As shown in FIGS. 4 and 20 to 23, the front surface covering plate part 4202 and the side surface portions 4204 cover the front surface 5006 and the side surfaces 5202 of the lens-barrel body 52, the spring pieces 4210 are locked to the front surface 5006 (the front surface 2602), and the lock projections 5210 are inserted into the locking openings 4208, whereon the spring pieces 4210 are elastically deformed, the spring pieces 4210 are pressed against the front surface 5006, and the portion of each lock projection 5210 located oppositely to the front surface 5006 is normally pressed against the edge 4208A, located at a position away from the spring piece 4210, of the locking opening 4208. In this embodiment, the front surface 5006 of the lens-barrel body 52 constitutes a lock surface to which the spring pieces 4210 are locked.

In this embodiment, the spring pieces 4210, the front surface 5006 of the lens-barrel body 52, the lock projections 5210, and the locking openings 4208 constitute a clamping mechanism 60 which functions so that the portion of the two adjacent lens-barrel component members is clamped from both ends in the above-mentioned stacking direction, whereby the shield case 40 is positioned relative to the lens-barrel 26 and mounted to the lens-barrel 26, in the stacking direction.

Besides, in this embodiment, as shown in FIG. 4, in the condition where the two adjacent lens-barrel component members, i.e., the shutter supporting housing 50 and the lens-barrel body 52, are clamped by the shield case 40 (the front split body 42) through the clamping mechanism 60, a gap S along the optical axis direction of the shooting optical system 24 is secured between the front surface covering plate part 4202 of the shield case 40 and the front surface 2602 of the lens-barrel 26.

According to this embodiment, the clamping mechanism 60 is provided so that the portion of the stacked and adjacent two lens-barrel component members, i.e., the portion of the shutter supporting housing 50 and the lens-barrel body 52, is clamped by the shield case 40 (the front split body 42) from both sides in the direction of the stacking. Therefore, even if the dispersions of dimensions of the shutter supporting housing 50 and the lens-barrel body 52 are added in the stacking direction, this configuration is advantageous in positioning the front split body 42 relative to the lens-barrel body 52 in the stacking direction, and in mounting the front split body 42 onto the lens-barrel body 52 without possibility of chattering in the stacking direction.

In addition, in this embodiment, the spring pieces 4210 provided in the front split body 42 are pressed against the front surface 5006 (lock surface) of the lens-barrel body 52, and the portions where the lock projections 5210 inserted in the locking openings 4208 are located oppositely to the front surface 5006 are pressed against the edges 4208A, located at positions spaced away from the spring pieces 4210, of the locking openings 4208. Therefore, this configuration is advantageous for accurately positioning the shield case 40 (the front split body 42) relative to the lens-barrel body 52 in the stacking direction, with the portions where the lock projections 5210 are located oppositely to the front surface 5006 as a reference, or with the edges 4208A, located at positions spaced from the spring pieces 4210, of the locking openings 4208, as a reference.

Besides, the condition where the shield case 40 (the front split body 42) is accurately positioned relative to the lens-barrel body 52 without possibility of chattering in the above-mentioned stacking direction is advantageous in preventing the so-called eclipse, i.e., the phenomenon in which the optical path ranging from an object to be shot to the shooting optical system 24 of the lens-barrel body 52 is obstructed by an edge portion constituting the opening 4206 of the shield case 40.

In addition, in this embodiment, the gap S is secured between the front surface covering plate part 4202 of the shield case 40 and the front surface 5006 of the lens-barrel body 52. Therefore, where an external force in a rearward direction of from the front side of the camera module 20 toward the lens-barrel body 52, the presence of the gap S as above-mentioned is advantageous for lessening the impact on the front surface 5006 of the lens-barrel 52.

Incidentally, while the case where a plurality of lens-barrel component members are stacked along the optical axis direction of the shooting optical system 24 has been described in the above embodiment, the present invention naturally is applicable to the case where a plurality of lens-barrel component members are stacked in a direction orthogonal to the optical axis direction of the shooting optical system 24. In this case, according to the present invention, the shield case 40 is positioned relative to the lens-barrel body 52 in the direction of stacking of the plurality of lens-barrel component members, so that the optical path of the shooting optical system 24 and the opening 4206 provided in the shield case 40 can be accurately positioned, which is advantageous in preventing the so-called eclipse.

In addition, while the case where the spring pieces 4210, the front surface 5006 of the lens-barrel body 52, the lock projections 5210 and the locking openings 4208 constitute the clamping mechanism 60 has been described in the above embodiment, the configuration of the clamping mechanism 60 is not limited to this configuration, and known various clamping structures may be adopted. However, the configuration of the clamping mechanism 60 as in the above embodiment is advantageous for simplifying the structure.

Besides, while the case where the plurality of lens-barrel component members include two members, namely, the shutter supporting housing 50 and the lens-barrel body 52 has been described in the above embodiment, the number of the lens-barrel component members may naturally be three or more.

Furthermore, while the case where the electronic apparatus is a cellular phone 10 has been described in the above embodiment, the present invention is widely applicable to portable information terminals such as PDA, notebook type personal computers, etc. and various shooting apparatuses such as digital still cameras, video cameras, etc.

It should be understood by those skilled in the art that various modifications, combinations, sub-combinations and alterations may occur depending on design and other factors insofar as they are within the scope of the appended claims or the equivalents thereof.

What is claimed is:

1. A camera module comprising:
   a camera body including a lens-barrel holding a shooting optical system, a substrate attached to said lens-barrel, an image pickup device incorporated in said lens-barrel and operative to pick up an image of an object focused by said shooting optical system and to output an image pickup signal, and a signal processing unit provided on said substrate and operative to receive said image pickup signal outputted from said image pickup device and to perform a predetermined signal processing; and
   a shield case covering said lens-barrel and said substrate and operative to provide electromagnetic shielding for said image pickup device and said signal processing unit, the shield case including a front split body and rear split body, the front split body having a generally rectangularly-shaped front surface plate part and four side surface plate parts connected to and depending perpendicularly from the front surface plate part to form a box-shaped configuration with at least one of the four side surface plate parts having a contact plate part connected thereto at an acute angle extending away from the box-shaped configuration, the rear split body having a generally rectangularly-shaped substrate covering plate part and a facially-opposing pair side surface portions connected to and depending perpendicularly from the substrate covering plate part along respective ones of side edges with each one of the pair of side surface portions having a lock part projection extending parallel to the side edges;
   wherein said lens-barrel includes a plurality of lens-barrel component members stacked together; and
   a clamping mechanism is provided by which a portion of two said lens-barrel component members adjacent to each other is clamped from both ends in the direction of said stacking, whereby said shield case is positioned relative to said lens-barrel and mounted to said lens-barrel, in the direction of said stacking,
   wherein the front split body is releasably connected to one of the two lens-barrel component members and the rear split body is releasably connected to a remaining one of the two lens-barrel component members by releasable engagement with the respective ones of the lock part projections while the contact plate part of the front split body and one of the pair of side surface portions of the rear split body contact each other.

2. The camera module as set forth in claim 1, wherein the front end lens-barrel component member located at the front end in the optical axis direction of said shooting optical system, of said plurality of lens-barrel component members, has a front surface formed with an aperture of an optical path constituting said shooting optical system, said shield case has a front surface covering plate part covering the front surface of said front end lens-barrel component member, and said front surface covering plate part is provided with an opening at a position corresponding to said aperture of said optical path.

3. The camera module as set forth in claim 1, wherein said clamping mechanism includes:
   an elastically deformable spring piece provided in said shield case;
   a locking opening provided at a position of said shield case spaced from said spring piece along the direction of elastic deformation of said spring piece;
   a lock surface which is provided in one of two said lens-barrel component members adjacent to each other and to which said spring piece is locked; and
   a projection which is provided in the other of two said lens-barrel component members adjacent to each other and which is inserted in said locking opening;
   wherein, by the locking of said spring piece to said lock surface and the insertion of said projection in said locking opening, said spring piece is elastically deformed, said spring piece is pressed against said lock surface, and a portion of said projection located oppositely to said lock surface is normally pressed against to an edge, located at a position spaced from said spring piece, of said locking opening.

4. A camera module, comprising:
   a camera body including a lens-barrel holding a shooting optical system, a substrate attached to said lens-barrel, an image pickup device incorporated in said lens-barrel and operative to pick up an image of an object focused by said shooting optical system and to output an image pickup signal, and a signal processing unit provided on said substrate and operative to receive said image pickup signal outputted from said image pickup device and to perform a predetermined signal processing; and
   a shield case covering said lens-barrel and said substrate and operative to provide electromagnetic shielding for said image pickup device and said signal processing unit;
   wherein said lens-barrel includes a plurality of lens-barrel component members stacked together; and
      a clamping mechanism is provided by which a portion of two said lens-barrel component members adjacent to each other is clamped from both ends in the direction of said stacking, whereby said shield case is positioned relative to said lens-barrel and mounted to said lens-barrel, in the direction of said stacking, wherein said clamping mechanism includes:
an elastically deformable spring piece provided in said shield case;
a locking opening provided at a position of said shield case spaced from said spring piece along the direction of elastic deformation of said spring piece;
a lock surface which is provided in one of two said lens-barrel component members adjacent to each other and to which said spring piece is locked; and
a projection which is provided in the other of two said lens-barrel component members adjacent to each other and which is inserted in said locking opening;
wherein, by the locking of said spring piece to said lock surface and the insertion of said projection in said locking opening, said spring piece is elastically deformed, said spring piece is pressed against said lock surface, and a portion of said projection located oppositely to said lock surface is normally pressed against to an edge, located at a position spaced from said spring piece, of said locking opening, and
wherein the front end lens-barrel component member located at the front end in the optical axis direction of said shooting optical system, of said plurality of lens-barrel component members, has a front surface formed with an aperture of an optical path constituting said shooting optical system; said shield case includes a rectangular front surface covering plate part covering the front surface of said front end lens-barrel component member, and a side surface part bent from said front surface covering plate part; said spring piece is formed in said front surface covering plate part; and said locking opening is provided in said side surface part.

5. The camera module as set forth in claim 1, wherein said lens-barrel has a front end and a rear end at positions on both sides along the optical axis of said shooting optical system; said substrate is attached to the rear end of said lens-barrel; said front split body covering a portion inclusive of the front end of said lens-barrel, and said rear split body covering a portion inclusive of said substrate; said clamping mechanism is provided over the range of said portion inclusive of the front end of said lens-barrel and said front split body; and, by said clamping mechanism, said front split body is positioned relative to said lens-barrel and mounted to said lens-barrel, in the direction of stacking of said plurality of lens-barrel component members.

6. The camera module as set forth in claim 1,
wherein said lens-barrel has a front end and a rear end at positions on both sides along the optical axis of said shooting optical system;
said substrate is attached to the rear end of said lens-barrel;
said front split body covering a portion inclusive of the front end of said lens-barrel, and said rear split body covering a portion inclusive of said substrate;
a front end lens-barrel component member located at the front end in the optical axis direction, of said plurality of lens-barrel component members, has a front surface formed with an aperture of an optical path constituting said shooting optical system;
said front split body has a rectangular front surface covering plate part covering said front surface of said front end lens-barrel component member, and a side surface part bent from said front surface covering plate part; and
said clamping mechanism has an elastically deformable spring piece provided in said front surface covering plate part, a locking opening provided at a position of said side surface part spaced from said spring piece along said optical axis, said front surface of said front end lens-barrel component member to which said spring piece is locked, and a projection which is provided in said lens-barrel component member stacked adjacently to said front end lens-barrel component member;
wherein by the locking of said spring piece to said front surface of said front end lens-barrel component member and the insertion of said projection in said locking opening, said spring piece is elastically deformed, said spring piece is pressed against said front surface of said front end lens-barrel component member, and a portion of said projection located oppositely to said front surface of said front end lens-barrel component member is normally pressed against to an edge, located at a position spaced from said spring piece, of said locking opening.

7. A camera module, comprising:
a camera body including a lens-barrel holding a shooting optical system, a substrate attached to said lens-barrel, an image pickup device incorporated in said lens-barrel and operative to pick up an image of an object focused by said shooting optical system and to output an image pickup signal, and a signal processing unit provided on said substrate and operative to receive said image pickup signal outputted from said image pickup device and to perform a predetermined signal processing; and
a shield case covering said lens-barrel and said substrate and operative to provide electromagnetic shielding for said image pickup device and said signal processing unit;
wherein said lens-barrel includes a plurality of lens-barrel component members stacked together; and
a clamping mechanism is provided by which a portion of two said lens-barrel component members adjacent to each other is clamped from both ends in the direction of said stacking, whereby said shield case is positioned relative to said lens-barrel and mounted to said lens-barrel, in the direction of said stacking
wherein said lens-barrel has a front end and a rear end at positions on both sides along the optical axis of said shooting optical system;
said substrate is attached to the rear end of said lens-barrel;
said shield case includes a front split body covering a portion inclusive of the front end of said lens-barrel, and a rear split body covering a portion inclusive of said substrate;
a front end lens-barrel component member located at the front end in the optical axis direction, of said plurality of lens-barrel component members, has a front surface formed with an aperture of an optical path constituting said shooting optical system;
said front split body has a rectangular front surface covering plate part covering said front surface of said front end lens-barrel component member, and a side surface part bent from said front surface covering plate part; and
said clamping mechanism has an elastically deformable spring piece provided in said front surface covering plate part, a locking opening provided at a position of said side surface part spaced from said spring piece along said optical axis, said front surface of said front end lens-barrel component member to which said spring piece is locked, and a projection which is provided in said lens-barrel component member stacked adjacently to said front end lens-barrel component member;
wherein by the locking of said spring piece to said front surface of said front end lens-barrel component member and the insertion of said projection in said locking opening, said spring piece is elastically deformed, said spring piece is pressed against said front surface of said front end lens-barrel component member, and a portion of said projection located oppositely to said front surface of said front end lens-barrel component member is normally pressed against to an edge, located at a position spaced from said spring piece, of said locking opening and wherein an end portion of said side surface part passing through said locking opening in a direction of spacing away from said front surface covering plate part is provided with a bent piece bent to the outside of said side surface part.

8. The camera module as set forth in claim 6, wherein the condition where said spring piece is pressed against to said front surface of said front end lens-barrel component member and said portion of said projection located oppositely to said front surface of said front end lens-barrel component member is normally pressed against said edge, located at a position spaced from said spring piece, of said locking opening, ensures that a gap along said optical axis direction is secured between said front surface of said front end lens-barrel component member and said front surface covering plate part.

9. The camera module as set forth in claim 1, wherein said shield case is formed of an elastic and conductive material.

10. The camera module as set forth in claim 1, wherein said plurality of lens-barrel component members are stacked along the optical axis direction of said shooting optical system.

11. An electronic apparatus comprising:

a casing; and a camera module incorporated in said casing;

wherein said camera module includes a camera body, and a shield case said camera body includes a lens-barrel holding a shooting optical system, a substrate attached to said lens-barrel, an image pickup device incorporated in said lens-barrel and operative to pick up an image of an object focused by said shooting optical system and to output an image pickup signal, and a signal processing unit provided on said substrate and operative to receive said image pickup signal outputted from said image pickup device and to perform a predetermined signal processing, said shield case covers said lens-barrel and said substrate and provides electromagnetic shielding for said image pickup device and said signal processing unit, the shield case including a front split body and rear split body, the front split body having a generally rectangularly-shaped front surface plate part and four side surhice plate parts connected to and depending perpendicularly from the front surface plate part to form a box-shaped configuration with at least one of the four side surface plate parts having a contact plate part connected thereto at an acute angle extending away from the box-shaped configuration, the rear split body having a generally rectangularly-shaped substrate covering plate part and a facially-opposing pair sidesurface portions connected to and depending perpendicularly from the substrate covering plate part along respective ones of side edges with each one of the pair of side surface portions having a lock part projection extending parallel to the side edges, said lens-barrel includes a plurality of lens-barrel component members stacked together, and a clamping mechanism is provided by which a portion of two said lens-barrel component members adjacent to each other is clamped from both ends in the direction of said stacking, whereby said shield case is positioned relative to said lens-barrel and mounted to said lens-barrel, in the direction of said stacking, wherein the front split body is releasably connected to one of the two lens-barrel component members and the rear split body is releasably connected to a remaining one of the two lens-barrel component members by releasable engagement with the respective ones of the lock part proiections while the contact plate part of the front split body and one of the pair of side surface portions of the rear split body contact each other.

* * * * *